US009481372B2

(12) United States Patent
Ono et al.

(10) Patent No.: US 9,481,372 B2
(45) Date of Patent: Nov. 1, 2016

(54) SPEED CHANGE APPARATUS FOR VEHICLE

(71) Applicant: HONDA MOTOR CO., LTD., Tokyo (JP)

(72) Inventors: Junya Ono, Wako (JP); Yoshiaki Nedachi, Wako (JP); Tatsuya Ryuzaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/075,297

(22) Filed: Mar. 21, 2016

(65) Prior Publication Data

US 2016/0288795 A1 Oct. 6, 2016

(30) Foreign Application Priority Data

Mar. 30, 2015 (JP) ................................. 2015-070048

(51) Int. Cl.
*B60K 23/02* (2006.01)
*B60W 10/02* (2006.01)
(Continued)

(52) U.S. Cl.
CPC .............. *B60W 30/19* (2013.01); *B60W 10/02* (2013.01); *B60W 10/06* (2013.01);
(Continued)

(58) Field of Classification Search
CPC .............. B60W 10/02; B60W 10/06; B60W 2540/10; B60W 2520/10; B60W 30/19; B60W 10/11; B60W 10/10; B60W 20/00; B60W 2510/0638; B60W 30/1819; B60W 30/18; B60W 30/18027; B60W 10/08; B60W 2710/0616; B60W 2520/28; B60W 2520/26; B60W 2710/027; B60W 2710/083; B60W 10/113; B60W 2510/0225; B60W 2710/0644; B60W 10/101; B60W 2510/0208; B60W 2510/105; B60W 2540/12; B60W 2710/022; B60W 2710/025; B60W 2710/0605; B60W 2710/105; B60W 30/18018; B60W 30/18118; B60W 30/18172; B60W 30/192; B60W 10/04; B60W 10/18; B60W 2510/0604; B60W 2510/081; B60W 2540/14; B60W 2540/16; B60W 2710/023; B60W 2710/065; B60W 10/111; B60W 10/184; B60W 2510/0657; B60W 2510/0685; B60W 2510/1015; B60W 2510/244; B60W 2710/021; B60W 2710/081; B60W 2710/086; B60W 2710/1005; B60W 30/18054; B60W 30/1846; B60W 30/186; B60W 30/20; B60W 50/06; B60W 10/115; B60W 10/26; B60W 2050/0088; B60W 20/15; B60W 20/40; B60W 2510/0291; B60W 2510/083; B60W 2510/1025; B60W 2520/105; B60W 2710/0622; B60W 2710/0666; B60W 2710/085; B60W 2720/106; B60W 30/18045; B60W 30/18063; B60W 30/181; B60W 30/18181; B60W 50/0098; B60W 23/02
See application file for complete search history.

(56) References Cited

U.S. PATENT DOCUMENTS

2007/0240956 A1* 10/2007 Minami ................ B60W 10/02
192/3.63
2009/0084210 A1* 4/2009 Tsukada ................ F16D 11/10
74/330

(Continued)

FOREIGN PATENT DOCUMENTS

JP 08-93786 A 4/1996
WO WO 2014/157631 A1 10/2014

*Primary Examiner* — Sherry Estremsky
*Assistant Examiner* — Lillian Nguyen
(74) *Attorney, Agent, or Firm* — Squire Patton Boggs (US) LLP

(57) ABSTRACT

After a speed change operation mechanism has changed gear position during a shift in a vehicle, a controller operates an actuator to put a clutch into a partial clutch engagement state, thereby reducing difference rotation Nd of the clutch, and temporarily lowers an output of an engine below a normal-time output. After the difference rotation of the clutch is reduced, the controller returns the engine output to the normal-time output, and operates the actuator to bring the clutch into a full capacity state. The standard difference rotational speed Nds is variable according to the throttle position Th detected by the engine load detection means.

8 Claims, 24 Drawing Sheets

(51) Int. Cl.
*B60W 30/19* (2012.01)
*B60W 10/06* (2006.01)

(52) U.S. Cl.
CPC .............. *B60W 2510/0241* (2013.01); *B60W 2510/0638* (2013.01); *B60W 2510/1015* (2013.01); *B60W 2710/021* (2013.01); *B60W 2710/0644* (2013.01)

(56) References Cited

U.S. PATENT DOCUMENTS

2011/0190990 A1* 8/2011 Nedachi ................ F16D 48/064
　　　　　　　　　　　　　　　　　　　　　　701/51
2012/0298466 A1* 11/2012 Nedachi .................. F16D 48/06
　　　　　　　　　　　　　　　　　　　　　　192/84.6

* cited by examiner

FIG. 21

| THROTTLE POSITION / ROTATIONAL SPEED (rpm) | 5% | 10% | 15% | 20% | 30% | 40% | 50% | 60% | 75% | 100% |
|---|---|---|---|---|---|---|---|---|---|---|
| 3000 | 500 | 500 | 450 | 450 | 500 | 500 | 450 | 450 | 450 | 450 |
| 3500 | — | 500 | 450 | 450 | 500 | 500 | 450 | 450 | 450 | 450 |
| 4000 | — | 500 | 450 | 450 | 500 | 500 | 450 | 450 | 450 | 450 |
| 4500 | — | 500 | 450 | 450 | 450 | 500 | 450 | 450 | 450 | 450 |
| 5000 | — | 500 | 500 | 450 | 450 | 500 | 450 | 450 | 450 | 450 |
| 5500 | — | 500 | 500 | 450 | 450 | 500 | 500 | 450 | 450 | 450 |
| 6000 | — | — | 500 | 500 | 450 | 500 | 500 | 500 | 450 | 450 |
| 6500 | — | — | 500 | 500 | 450 | 450 | 500 | 500 | 500 | 450 |
| 7000 | — | — | 500 | 500 | 500 | 450 | 500 | 500 | 500 | 500 |
| 7500 | — | — | — | 500 | 500 | 500 | 500 | 500 | 500 | 500 |
| 8000 | — | — | — | 500 | 500 | 500 | 500 | 500 | 500 | 500 |
| 8500 | — | — | — | — | 500 | 500 | 500 | 500 | 500 | 500 |

STANDARD DIFFERENCE ROTATIONAL SPEED Nds

SPEED CHANGE APPARATUS FOR VEHICLE

BACKGROUND

1. Field

The present invention relates to a speed change apparatus for a vehicle.

2. Description of the Related Art

Conventionally, there has been disclosed an AMT (automated manual transmission) vehicle provided thereon with a three-stage capacity clutch in which three stages of clutch capacity (a clutch full capacity, a higher intermediate capacity, and a lower intermediate capacity) can be selected (see, for example, PCT Patent Publication No. WO 2014/157631 (Patent Document 1)). In the speed change apparatus of Patent Document 1, during clutch difference rotation absorption for absorbing a difference rotation between a clutch outer (on the engine side) and a clutch center (on the transmission side) at the time of a shift, it is possible to select the higher intermediate capacity and the lower intermediate capacity as the clutch capacity, in consideration of the rear wheel driving force after the shift on the basis of throttle position, etc. Though not disclosed in detail in Patent Document 1, during absorption of the clutch difference rotation, a retard control of ignition (a control for temporarily lowering the engine output) is performed in order to prevent so-called "blow-up" in which the engine rotational speed rises rapidly.

Meanwhile, such a speed change apparatus as disclosed in Patent Document 1 has some problems on a control basis during the period around the completion of the clutch difference rotation absorption.

Problem 1: During the difference rotation absorption at the time of shifting-up, the output on the engine side is in a lowered state due to a retard control of ignition, although the rotational speed is higher on the engine side than on the transmission side. Therefore, when the rotational speed of the clutch outer and that of the clutch center are synchronized by an intermediate clutch capacity, a deficiency in power on the engine side and the corresponding lowering in the driving force may be generated immediately after the synchronization.

Problem 2: If the retard control of ignition is returned (finished) in an intermediate clutch capacity state before completion of the difference rotation absorption, for the purpose of solving Problem 1, a rise in the engine output may cause blow-up of the engine, whereby the difference rotation being decreased by synchronization may be enlarged.

Problem 3: If the retard control of ignition is returned (the engine output is returned to a normal output) and the clutch capacity is brought to a full capacity before completion of the difference rotation absorption, in order to solve Problems 1 and 2, an acceleration vibration (variation in acceleration of the vehicle; so-called shift shock) may be generated, depending on the operating conditions such as throttle position.

SUMMARY

The present invention has been made in consideration of the above-mentioned problems in the related art. Accordingly, it is an object of the present invention to make it possible to restrain a drop in driving force, blow-up of engine rotational speed and vibration of vehicle acceleration during a period around the completion of a clutch difference rotation absorbing operation, in a speed change apparatus for a vehicle.

In order to achieve the above object, according to certain embodiments of the present invention, there is provided a speed change apparatus for a vehicle. The apparatus can include a main shaft to which rotational power of an engine is inputted through a clutch, and which is provided with a plurality of driving gears inclusive of a driving-side shifter gear. A counter shaft is provided with a plurality of driven gears driven by the driving gears, the driven gears including a driven-side shifter gear. A clutch operation member is driven by an actuator, and configured to engage and disengage the clutch. A gear change operation mechanism is configured to operate the driving-side shifter gear or the driven-side shifter gear to thereby operate a gear position. A controller is configured to operate the actuator, and engine rotational speed detection means are provided for detecting rotational speed of the engine. Main shaft rotational speed detection means are provided for detecting rotational speed of the main shaft on a downstream side of the clutch. The controller is configured to control an output of the engine and to detect difference rotation of the clutch on the basis of values detected by the engine rotational speed detection means and the main shaft rotational speed detection means. The clutch has a partial clutch engagement state between a clutch full capacity state and a clutch disengaged state. Engine load detection means detect a load on the engine. In addition, the controller is so configured that after the gear change operation mechanism has changed the gear position at the time of a shift, the controller operates the actuator to put the clutch into the partial clutch engagement state, thereby reducing the difference rotation of the clutch, and temporarily lowers the output of the engine below a normal-time output. After the difference rotation of the clutch is reduced to or below a standard difference rotational speed, the controller returns the output of the engine to the normal-time output and operates the actuator to bring the clutch into the full capacity state. The standard difference rotational speed is variable according to the engine load detected by the engine load detection means.

In accordance with certain embodiments, the controller is so configured that after the speed change operation mechanism has changed the gear position at the time of a shift, the controller operates the actuator to put the clutch into the partial clutch engagement state. This reduces the difference rotation of the clutch, and temporarily lowers the output of the engine below a normal-time output. After the difference rotation of the clutch is reduced to or below a standard difference rotational speed, the controller returns the output of the engine to the normal-time output and operates the actuator to bring the clutch into the full capacity state. The standard difference rotational speed is variable according to the engine load detected by the engine load detection means. In the case of reducing the difference rotation by the partial clutch engagement state, when the difference rotation of the clutch is reduced to or below the standard difference rotational speed, the output of the engine having been temporarily lowered is returned to a normal-time output. The actuator is operated to bring the clutch into the full capacity state, whereby a drop in driving force and blow-up of engine rotational speed during the period around the completion of the difference rotation absorption can be effectively restrained. When the difference rotation of the clutch is reduced to or below the standard difference rotational speed and the clutch is brought to the full capacity state, the extent to which the acceleration vibration is generated depends on the load on the engine at that time. For this reason, with the standard difference rotational speed being variable depending on the engine load detected by the engine load detection means, the clutch can be engaged at the difference rotation according to the engine load and be thereby brought into the full capacity state, so that the acceleration vibration can be effectively restrained. Note that examples of the technique for lowering the output of the engine includes a retard control of ignition, an ignition cut control, a throttling control at the throttle valve provided in the intake pipe, and a fuel injection control (cut-down or cut of the fuel injection amount).

The speed change apparatus for a vehicle according to embodiments of the present invention may also have a configuration wherein the standard difference rotational speed (Nds) is set to be lower as the engine load (Th) is higher.

The standard difference rotational speed can be set to be lower as the engine load is greater. As the engine load is higher, the torque of the engine is greater, and acceleration vibration is more likely to occur at the time of completion of the difference rotation absorption. For this reason, with the standard difference rotational speed set to be lower as the engine load is higher, the timing for engaging the clutch to attain the full capacity state at the time of completion of the difference rotation absorption can be properly set, whereby the acceleration vibration can be effectively restrained or reduced.

According to certain embodiments of the invention, a main shaft is provided, to which rotational power of an engine is inputted through a clutch and which is provided with a plurality of driving gears inclusive of a driving-side shifter gear. A counter shaft is provided with a plurality of driven gears driven by the driving gears, the driven gears including a driven-side shifter gear. A clutch operation member is driven by an actuator and configured to engage and disengage the clutch. A gear change operation mechanism is configured to operate the driving-side shifter gear or the driven-side shifter gear to thereby operate a gear position. A controller is configured to operate the actuator, and engine rotational speed detection means detects rotational speed of the engine. Main shaft rotational speed detection means detects rotational speed of the main shaft on a downstream side of the clutch. The controller is configured to control an output of the engine and detect difference rotation of the clutch on the basis of values detected by the engine rotational speed detection means and the main shaft rotational speed detection means. The clutch has a partial clutch engagement state between a clutch full capacity state and a clutch disengaged state. The controller is so configured that after the gear change operation mechanism has changed the gear position at the time of a shift, the controller operates the actuator to put the clutch into the partial clutch engagement state, thereby reducing the difference rotation of the clutch, and temporarily lowers the output of the engine below a normal-time output. After the difference rotation of the clutch is reduced to or below a standard difference rotational speed, the controller returns the output of the engine to the normal-time output, and operates the actuator to bring the clutch into the full capacity state. The standard difference rotational speed is variable according to the rotational speed of the engine detected by the engine rotational speed detection means.

The controller can be so configured that after the gear change operation mechanism has changed the gear position at the time of a shift, the controller operates the actuator to put the clutch into the partial clutch engagement state. This can reduce the difference rotation of the clutch, and temporarily lowers the output of the engine below a normal-time output. After the difference rotation of the clutch is reduced to or below a standard difference rotational speed, the controller returns the output of the engine to the normal-time output, and operates the actuator to bring the clutch into the full capacity state. The standard difference rotational speed is variable according to the rotational speed of the engine detected by the engine rotational speed detection means. In the case of reducing the difference rotation by the partial clutch engagement state, when the difference rotation of the clutch has been reduced to or below the standard difference rotational speed, the output of the engine having been temporarily lowered is returned to the normal-time output, and the actuator is operated to bring the clutch into the full capacity state. A drop in driving force and blow-up of engine rotational speed during a period around the completion of the difference rotation absorption can be effectively restrained or reduced. When the difference rotation of the clutch is reduced to or below the standard difference rotational speed and the clutch is brought into the full capacity state, the extent to which the acceleration vibration is generated depends on the rotational speed of the engine at that time. For this reason, with the standard difference rotational speed being variable according to the rotational speed detected by the engine rotational speed detection means, the clutch can be engaged to attain the full capacity state at a difference rotation according to the rotational speed of the engine; the acceleration vibration can be effectively restrained.

Embodiments of the present invention may have a configuration wherein the standard difference rotational speed is set to be higher as the rotational speed of the engine is higher.

The standard difference rotational speed can be set to be higher as the rotational speed of the engine is higher. As the rotational speed of the engine is higher, the torque of the engine is lower, and acceleration vibration is less likely to be generated at the time of completion of the difference rotation absorption. For this reason, with the standard difference rotational speed set to be higher as the rotational speed of the engine is higher, the acceleration vibration can be effectively restrained while shortening the time for which the clutch is in a disengaged state.

With the standard difference rotational speed being variable according to the engine load detected by the engine load detection means, the acceleration vibration can be effectively restrained.

In addition, with the standard difference rotational speed set lower as the engine load is higher, the acceleration vibration can be effectively restrained.

With the standard difference rotational speed being variable according to the rotational speed detected by the engine rotational speed detection means, the acceleration vibration can be effectively restrained.

Further, with the standard difference rotational speed set higher as the rotational speed of the engine is higher, the acceleration vibration can be effectively restrained while shortening the time for which the clutch is in a disengaged state.

BRIEF DESCRIPTION OF THE DRAWINGS

FIG. 21 is a diagram showing an example of a map for selection of a standard difference rotational speed.

DETAILED DESCRIPTION

Figure 1:
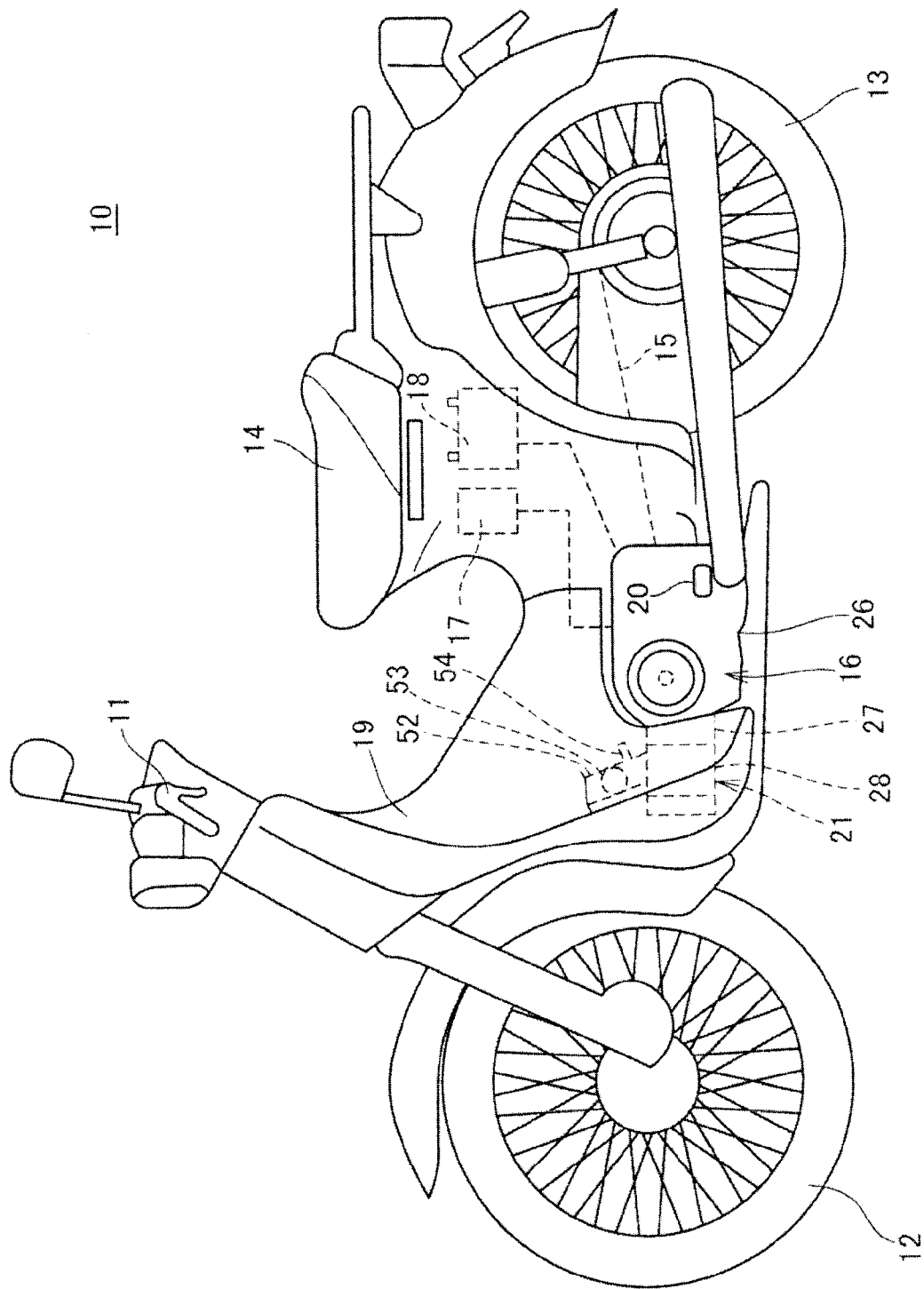
FIG. 1 is a left side view of a motorcycle provided with an automatic speed change apparatus according to an embodiment of the present invention.

Embodiments of the present invention will now be described below referring to the drawings.

FIG. 1 is a left side view of a motorcycle 10 provided with an automatic speed change apparatus 25 according to an embodiment of the present invention.

The motorcycle 10 (vehicle) includes a handlebar 11 rotatably supported on a head pipe (not shown), a front wheel 12 steered by the handlebar 11, a rear wheel 13 as a driving wheel, a seat 14 on which to seat a driver, a power unit 16 configured to supply a driving force to the rear wheel 13 through a chain 15, a control unit 17 (controller) configured to control the power unit 16, and a battery 18.

The motorcycle 10 is configured based on a body frame (not shown), and the body frame is covered with a body cover 19. The control unit 17 and the battery 18 are disposed under the seat 14 and inside the body cover 19. The power unit 16 is provided at a roughly middle position between the front wheel 12 and the rear wheel 13, downwardly and slightly forwardly of the seat 14. A pair of left and right driver footrests 20 are provided at lower portions of the power unit 16.

The configuration of the power unit 16 will now be described.

Figure 2:
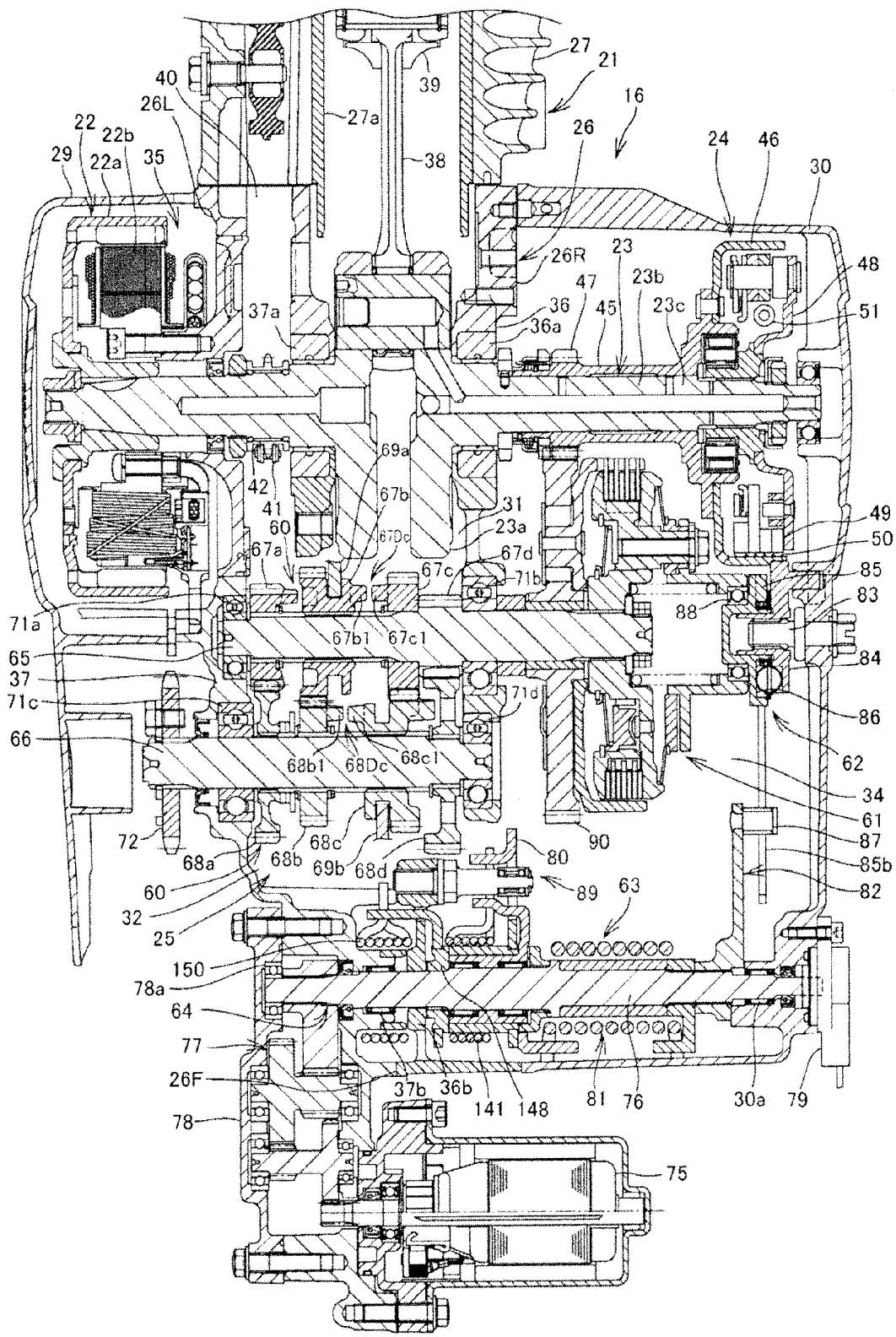
FIG. 2 is a sectional view of a power unit.

FIG. 2 is a sectional view of the power unit 16. In FIG. 2, the left-right direction on the sheet surface corresponds to the transverse direction (vehicle width direction), the upward direction on the sheet surface corresponds to the forward direction of the vehicle, and the downward direction on the sheet surface corresponds to the rearward direction of the vehicle.

The power unit 16 can include an engine 21 configured to generate a driving force for running, a generator 22, a starting clutch 24 provided on a crankshaft 23 of the engine 21, and the automatic speed change apparatus 25 (speed change apparatus) configured to output a driving force of the crankshaft 23 (which is outputted through the starting clutch 24) with speed change.

The engine 21 is configured by integrally connecting a crankcase 26 (case member), a cylinder 27, and a cylinder head 28.

As illustrated in FIG. 1, an intake pipe 52 extending from an air cleaner box (not shown) is connected to an intake port of the cylinder head 28. The intake pipe 52 is provided with an electronically controlled throttle valve 53 for regulating the quantity of air supplied to the engine 21. In the intake pipe 52, a fuel injection valve 54 is provided downstream of the throttle valve 53.

The crankcase 26 is configured to be bisected into a left portion and a right portion (in the transverse direction) at a plane orthogonal to the crankshaft 23. Specifically, the crankcase 26 has a one-side case half 26L on the left side and an other-side case half 26R on the right side. In addition, the engine 21 is provided with a generator cover 29 which covers the one-side case half 26L from the left side, and a clutch cover 30 which covers the other-side case half 26R from the right side.

The one-side case half 26L and the other-side case half 26R are mated with each other at a faying surface 26F (faying portion), and are coupled together by a plurality of coupling bolts (not shown) extending in the transverse direction.

A crank chamber 31 in which to accommodate the crankshaft 23 is provided at a front portion of the inside of the crankcase 26. In the crankcase 26, a transmission chamber 32 is provided rearwardly of the crank chamber 31. The transmission chamber 32 is partitioned by a wall portion 37 (a wall portion of the case member; outer wall) of the one-side case half 26L constituting a left side surface of the crankcase 26, and a wall portion 36 (inner wall) of the other-side case half 26R constituting a right side surface of the crankcase 26.

A clutch chamber 34 is provided on the right side of the crank chamber 31 and the transmission chamber 32. A generator chamber 35 is provided on the left side of the crank chamber 31. The clutch chamber 34 is partitioned by an outside surface of the wall portion 36 of the other-side case half 26R and an inside surface of the clutch cover 30.

The generator chamber 35 is partitioned by an outside surface of the wall portion 37 of the one-side case half 26L and an inside surface of the generator cover 29.

The crankshaft 23 has a crank web 23a, and a shaft portion 23b extending toward both sides in the transverse direction from the crank web 23a. Of the crankshaft 23, the crank web 23a is disposed within the crank chamber 31, and the shaft portion 23b is rotatably borne on bearing portions 36a and 37a provided respectively at the wall portion 36 and the wall portion 37. A connecting rod 38 is connected to the crank web 23a through a crank pin. A piston 39 connected to a tip of the connecting rod 38 is reciprocated within a cylinder bore 27a of the cylinder 27.

One end of the shaft portion 23b of the crankshaft 23 extends into the generator chamber 35, and this end is fixed to a rotor 22a of the generator 22. A stator 22b of the generator 22 is fixed to the one-side case half 26L.

The wall portion 37 is provided with a cam chain chamber 40 on the inside thereof. A cam chain 41 for driving a valve mechanism (not shown) in the cylinder head 28 extends through the cam chain chamber 40 and is wrapped around a valve driving sprocket 42 on the shaft portion 23b.

An other end 23c of the shaft portion 23b of the crankshaft 23 extends into the clutch chamber 34. The starting clutch 24 of a centrifugal type is provided at a tip portion of the other end 23c.

The starting clutch 24 serves for engagement and disengagement between the crankshaft 23 and the automatic speed change apparatus 25 at the time of starting of the vehicle and at the time of stopping of the vehicle.

The starting clutch 24 includes a cup-shaped outer case 46 fixed to one end of a sleeve 45 rotatable relative to the outer circumference of the crankshaft 23. A primary gear 47 is provided at the outer circumference of the sleeve 45, and an outer plate 48 is fixed to a right end portion of the crankshaft 23. A shoe 50 is attached to an outer circumferential portion of the outer plate 48 through a weight 49 so as to be directed radially outward, and a spring 51 is provided for biasing the shoe 50 radially inward. The starting clutch 24 is so configured that when the rotational speed of the engine is not more than a predetermined value, the outer case 46 and the shoe 50 are separate from each other, and the crankshaft 23 and the automatic speed change apparatus 25 are in a disengaged state from each other (in a separated state where power is not transmitted therebetween). When the engine rotational speed rises to exceed a predetermined value, a centrifugal force causes the weight 49 to move radially outward against the spring 51, which brings the shoe 50 into contact with an inner circumferential surface of the outer case 46. This causes the sleeve 45 to be fixed onto the crankshaft 23 together with the outer case 46, resulting in that the rotation of the crankshaft 23 is transmitted to the automatic speed change apparatus 25 through the primary gear 47.

In the automatic speed change apparatus 25, switching-over of a change clutch 61 which will be described later and switching-over of gear position (shift) are performed automatically.

The automatic speed change apparatus 25 includes a forward four-speed normally meshed transmission 60. The change clutch 61 (clutch) is configured to switch over the connection between the crankshaft 23 side and the transmission 60. A clutch operation mechanism 62 (clutch operation member) is configured to operate the change clutch 61, and a gear change mechanism 63 (gear change operation mechanism) is configured to change gear in the transmission 60. An actuator mechanism 64 is configured to drive the clutch operation mechanism 62 and the gear change mechanism 63. The actuator mechanism 64 is controlled by the control unit 17 (FIG. 1).

The automatic speed change apparatus 25 is connected to a mode switch 132b (FIG. 9) for switching between an automatic transmission (AT) mode and a manual transmission (MT) mode, and to a shift selection switch 132a (FIG. 9) operated by the driver to select either a shift-up or a shift-down. The automatic speed change apparatus 25 is so configured that under a control of the control unit 17, the actuator mechanism 64 can be controlled according to output signals from sensors as well as the mode switch 132b and the shift selection switch 132a, thereby the gear position in the transmission 60 can be changed automatically or semi-automatically.

Specifically, in the automatic transmission mode, the actuator mechanism 64 is controlled on the basis of vehicle speed and the like, and a gear change (shift) in the transmission 60 is performed automatically. In the manual transmission mode, the driver operates the shift selection switch 132a to make a gear shift.

The transmission 60 transmits rotation, supplied from the change clutch 61, to the rear wheel 13 with a speed change on the basis of a command from the control unit 17. The transmission 60 includes a main shaft 65 as an input shaft, and a counter shaft 66 disposed in parallel to the main shaft 65. Driving gears 67a, 67b, 67c and 67d (a row of driving gears) are provided on the main shaft 65, and driven gears 68a, 68b, 68c and 68d (a row of driven gears) are provided on the counter shaft 66. The driving gears 67a, 67b, 67c and 67d and the driven gears 68a, 68b, 68c and 68d are constant-mesh type gears.

The driving gears 67a, 67b, 67c and 67d are in mesh with the driven gears 68a, 68b, 68c and 68d in this order. The driving gear 67b has dog teeth on a side surface thereof to be engaged with the adjacent driving gear 67a or 67c when the driving gear 67b is slid to the left or the right. The driven gear 68c has dog teeth on a side surface thereof to be engaged with the adjacent driven gear 68b or 68d when the driven gear 68c is slid to the left or the right.

The driving gears 67a and 67c (driving-side free gears) and the driven gears 68b and 68d (driven-side free gears) are free gears which are relatively rotatably retained on, and axially movable relative to, the main shaft 65 and the counter shaft 66, respectively.

The driving gear 67b (driving-side shifter gear) and the driven gear 68c (driven-side shifter gear) are shifter gears which are non-rotatably spline-coupled to, and axially slidable relative to, the main shaft 65 and the counter shaft 66, respectively.

The driving gear 67d and the driven gear 68a are fixed gears which are fixed to the main shaft 65 and the counter shaft 66, respectively.

For example, when the driving gear 67b (which is a shifter gear) is slid toward the side of the driving gear 67c (which is a free gear) by the gear change mechanism 63, the dog teeth 67b1 and 67c1 erected on opposed side surfaces of the driving gear 67b and the driving gear 67c mesh with each other at their side portions, whereby the driving gear 67b and the driving gear 67c are connected. As a result, the driving gear 67c (a free gear) is non-rotatably fixed on the main shaft 65 by the driving gear 67b which is non-rotatable relative to the main shaft 65, and a shift position defined by the driving gear 67c and the driven gear 68c is established. The dog teeth 67b1 and 67c1 are formed in pluralities at intervals along the circumferential direction, and constitute a dog clutch 67Dc for connecting the driving gear 67b and the driving gear 67c in an engageable and disengageable manner.

In addition, the driven gear 68c and the driven gear 68b are provided with dog teeth 68c1 and 68b1 erected from their opposed side surfaces. The dog teeth 68c1 and 68b1 are provided in pluralities at intervals along the circumferential direction, and constitute a dog clutch 68Dc by which the driven gear 68c and the driven gear 68b are coupled to each other in an engageable and disengageable manner.

In addition, the driving gear 67b and the driving gear 67a are connected, and the driven gear 68c and the driven gear 68d are connected, through respective similar dog clutches provided on their side surfaces in an engageable and disengageable manner.

The main shaft 65 is rotatably supported by bearings 71a and 71b, and the counter shaft 66 is rotatably supported by bearings 71c and 71d.

A drive sprocket 72 is provided at an end portion of the counter shaft 66. The drive sprocket 72 transmits rotation to the rear wheel 13 through the chain 15. In addition, a counter shaft rotational speed sensor (FIG. 9) configured to detect rotational speed of the counter shaft 66 in a non-contact manner is provided in the vicinity of the counter shaft 66. The control unit 17 calculates the vehicle speed from a value detected by the counter shaft rotational speed sensor 73. Further, a main shaft rotational speed sensor 65a (main shaft rotational speed detection means) (FIG. 9) configured to detect rotational speed Nm (FIG. 20) of the main shaft 65 in a non-contact manner is provided in the vicinity of the main shaft 65.

Figure 3:
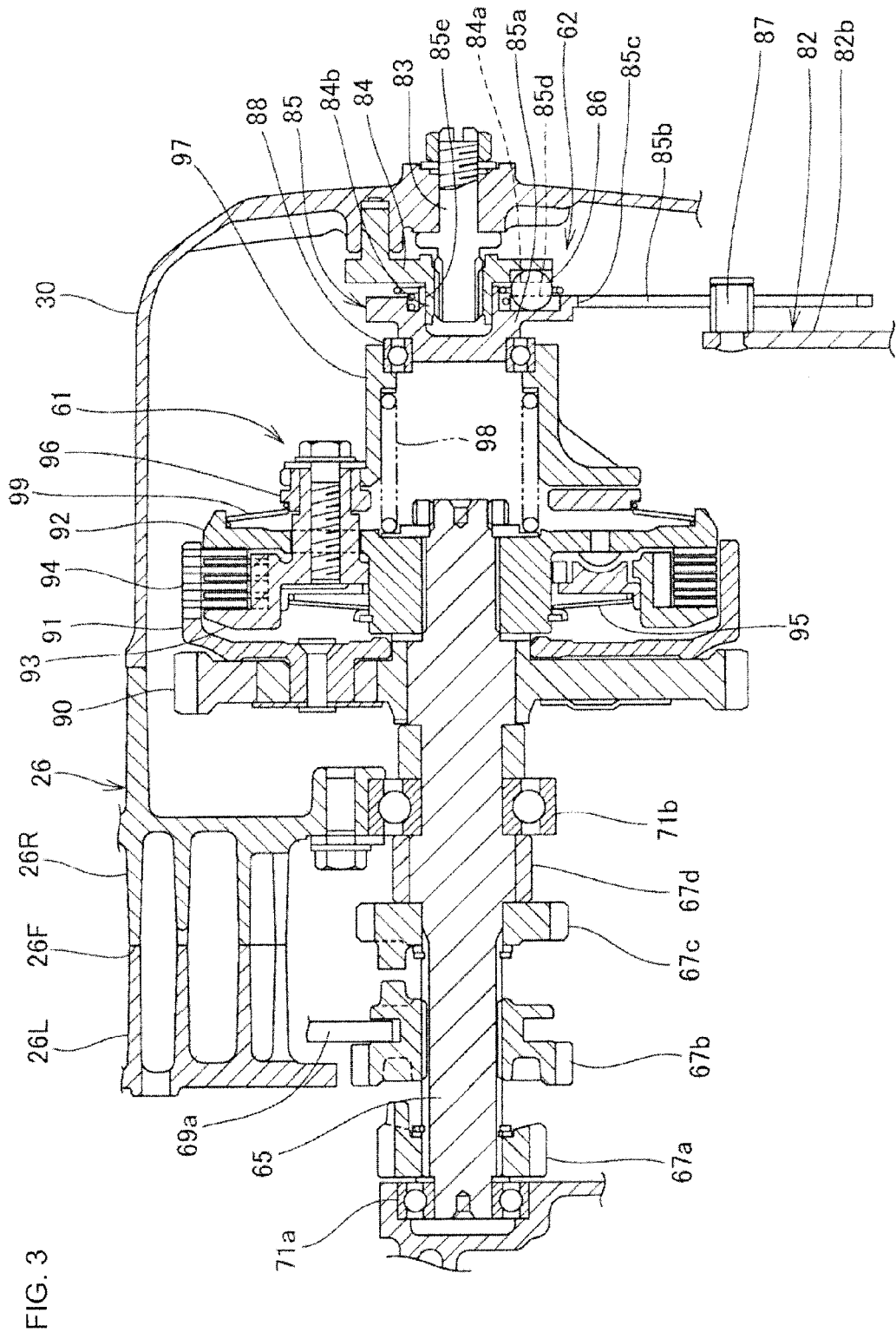
FIG. 3 is a sectional view showing a gear change mechanism, an actuator mechanism, a change clutch and a clutch operation mechanism.

FIG. 3 is a sectional view showing the change clutch 61 and the clutch operation mechanism 62.

Referring to FIGS. 2 and 3, the actuator mechanism 64 includes a shift motor 75 (actuator) as an actuator, and a shift spindle 76 (spindle member) extending in the transverse direction within the crankcase 26. A speed reduction gear train 77 is configured to transmit the rotation of the shift motor 75 with speed reduction to drive the shift spindle 76. One end in the axial direction of the speed reduction gear train 77 is supported on an outside surface of the wall portion 37 of the one-side case half 26L, and the other end is supported by a cover 78 covering the wall portion 37 from an outer side.

The shift spindle 76 is provided to extend through the inside of the clutch chamber 34. The shift spindle 76 is rotatably supported at its both ends by bearings 78a and 30a provided at the cover 78 and the clutch cover 30, respectively. In addition, the shift spindle 76 is rotatably supported at its intermediate portion by a bearing 37b provided at the wall portion 37 of the one-side case half 26L. A shift spindle angle sensor 79 (spindle angle sensor) configured to detect rotational position of the shift spindle 76 is provided on the clutch cover 30.

The gear change mechanism 63 includes a change mechanism 89 configured to slide the driving gear 67b and the driven gear 68c to thereby change a shift position, and a force accumulation mechanism 81 by which a force is accumulated in a force accumulation spring 145 (FIG. 10) (described later) by rotation of the shift spindle 76 and is thereafter released to rotate the change mechanism 89 at a stroke. The shift spindle 76 is shared by the gear change mechanism 63 and the clutch operation mechanism 62.

The change mechanism 89 includes a master arm 80 supported by the shift spindle 76 and rotated by the force accumulation mechanism 81, and a shift drum 70 (FIG. 13) rotated interlockedly with rotation of the master arm 80. Shift forks 69a and 69b are configured to connect the shift drum 70 to the driving gear 67b and the driven gear 68c which are shifter gears, and a support shaft (not shown) is configured to hold the shift forks 69a and 69b in an axially slidable manner.

The shift drum 70 is provided in its outer circumferential portion with a plurality of lead grooves 70a (FIG. 13) shaped according to shift patterns. One-side ends (end portions) of the shift forks 69a and 69b are connected to the lead grooves 70a.

When the shift drum 70 is driven by the actuator mechanism 64 to rotate, the shift forks 69a and 69b are moved in the axial direction along the lead grooves 70a of the shift drum 70, whereby the driving gear 67b and the driven gear 68c are slid according to a shift position.

In the transmission 60, according to sliding of the driving gear 67b and the driven gear 68c, either a neutral condition or a condition of power transmission through selective use of any one of first-speed to fourth-speed transmission gear pairs can be established between the main shaft 65 and the counter shaft 66.

The clutch operation mechanism 62 includes a clutch lever 82 fixed onto the shift spindle 76, and a support shaft 83 fixed to an inside surface of the clutch cover 30 in a positional relation such as to be substantially coaxial with the main shaft 65. A plate-shaped base member 84 is fixed to the support shaft 83, and a lifter cam plate 85 as an operating member is connected to the clutch lever 82 and is opposed to the base member 84, and a plurality of balls 86 are retained between the lifter cam plate 85 and the base member 84.

The clutch lever 82 includes a cylindrical portion 82a provided on the shift spindle 76 adjacently to the force accumulation mechanism 81, and a lever portion 82b extending radially outward from the cylindrical portion 82a. The clutch lever 82 is rotated as one body with the shift spindle 76.

The lifter cam plate 85 includes a pressing operation portion 85a facing the base member 84, and a connection arm portion 85b extending from the pressing operation portion 85a and connected to the lever portion 82b of the clutch lever 82. A cam hole 85c is formed in the connection arm portion 85b. The lifter cam plate 85 is connected to the clutch lever 82 by a structure in which a pin 87 provided at the tip of the lever portion 82b of the clutch lever 82 is inserted in the cam hole 85c.

Opposed surfaces of the pressing operation portion 85a and the base member 84 are formed with slant surface-shaped cam portions 85d and 84a, respectively. The balls 86 are retained between the cam portions 85d and 84a. The lifter cam plate 85 is guided in regard of its axial movement by a structure in which a guide shaft 84b of the base member 84 is fitted in a guide hole 85e formed in the center of the lifter cam plate 85. Besides, a ball bearing 88 is provided at a tip portion of the pressing operation portion 85a. The lifter cam plate 85 is connected to the change clutch 61 through the ball bearing 88.

When the clutch lever 82 is rotated, the lifter cam plate 85 is rotated about the guide shaft 84b through the pin 87, and is moved (lifted) in the axial direction through sliding of the cam portion 85d relative to the balls 86. The change clutch 61 is engaged and disengaged interlockedly with the axial movement of the lifter cam plate 85. The lifter cam plate 85 is moved in a clutch-disengaging direction irrespectively of whether the rotation of the shift spindle 76 from a normal position is in a shift-up direction or in a shift-down direction.

Figure 4:
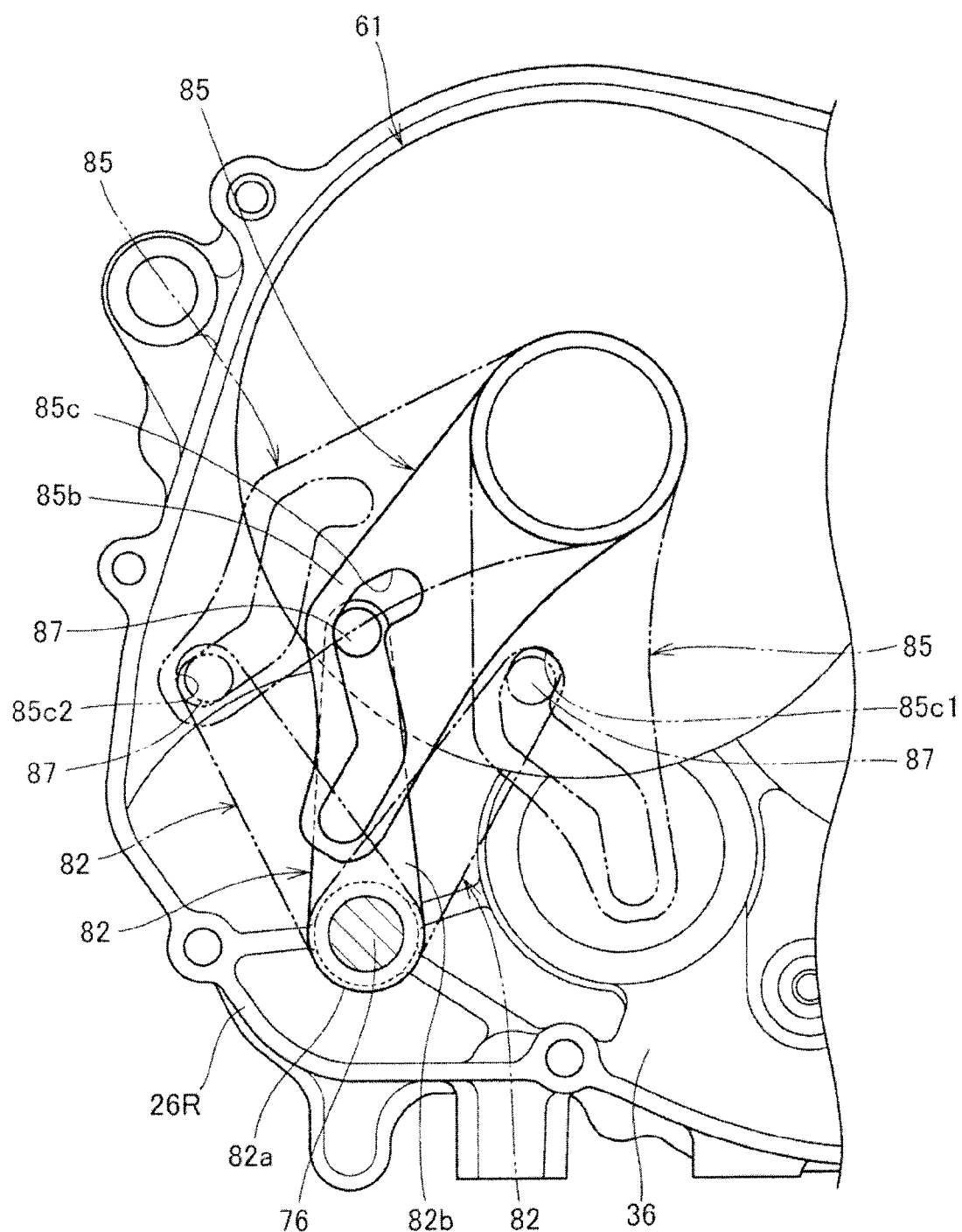
FIG. 4 is a side view showing an operating condition of a clutch lever and a lifter cam plate.

FIG. 4 is a side view showing an operating condition of the clutch lever 82 and the lifter cam plate 85.

The cam hole 85c of the lifter cam plate 85 is formed in a shape of being bent along a longitudinal direction of the connection arm portion 85b. As the shift spindle 76 rotates, the pin 87 of the clutch lever 82 moves within the cam hole 85c, whereby the lifter cam plate 85 is rotated. In other words, the axial moving amount of the lifter cam plate 85 per unit rotational amount can be set by the shape of the cam hole 85c, whereby engagement/disengagement characteristics of the change clutch 61 can be adjusted.

The shift spindle 76 is in a neutral position at normal times when neither a shift-up operation nor a shift-down operation is being conducted. In the neutral position, the clutch lever 82 extends upward substantially vertically from the shift spindle 76, and the pin 87 is located at an intermediate portion of the cam hole 85c.

In the case of shifting-up, the shift spindle is rotated clockwise in FIG. 4 (in a shift-up direction) from the neutral position, and the pin 87 is located at an inner end portion 85c1 of the cam hole 85c.

In the case of shifting-down, the shift spindle 76 is rotated counterclockwise in FIG. 4 (in a shift-down direction) from the neutral position, and the pin 87 is located at an outer end portion 85c2 of the cam hole 85c.

In the case of shifting-up, the control unit 17 rotates the shift motor 75 so as to rotate the shift spindle 76 in a shift-up direction. Attendant on the rotation of the shift spindle 76, force accumulation in the force accumulation mechanism 81 is started. When the shift spindle 76 is rotated a predetermined amount, the change clutch 61 is disengaged by rotation of the clutch lever 82. Attendant on the disengagement of the change clutch 61, the accumulated force is released, and the master arm 80 is turned to rotate the shift drum 70, whereby the gear position is shifted up by one position.

On the other hand, in the case of shifting-down, the control unit 17 rotates the shift motor 75 so as to rotate the shift spindle 76 in a shift-down direction. At the time of shifting-down, force accumulation by the force accumulation mechanism 81 is not performed. At the time of shifting-down, attendant on the rotation of the shift spindle 76, the clutch lever is rotated to disengage the change clutch 61. Thereafter, the master arm 80 is turned in a shift-down direction. As a result, the shift drum 70 is rotated, and the gear position is shifted down by one position.

In the cases of shifting-up and shifting-down, the shift spindle 76 is rotated reversely after the shifting operation, whereby the master arm 80 is returned into a neutral position, and the change clutch 61 is engaged.

In the present embodiment, both the gear change mechanism 63 and the clutch operation mechanism 62 are driven by the single shift spindle 76 rotated by the single shift motor 75. Therefore, only one shift motor 75 is needed, which enables a simplified structure.

As shown in FIG. 2, a primary driven gear 90 for meshing with the primary gear 47 on the crankshaft 23 side is provided on an end of the main shaft 65 extending into the clutch chamber 34. The primary driven gear 90 is supported to be rotatable relative to the main shaft 65. The change clutch 61 is connected to the primary driven gear 90.

Figure 5:
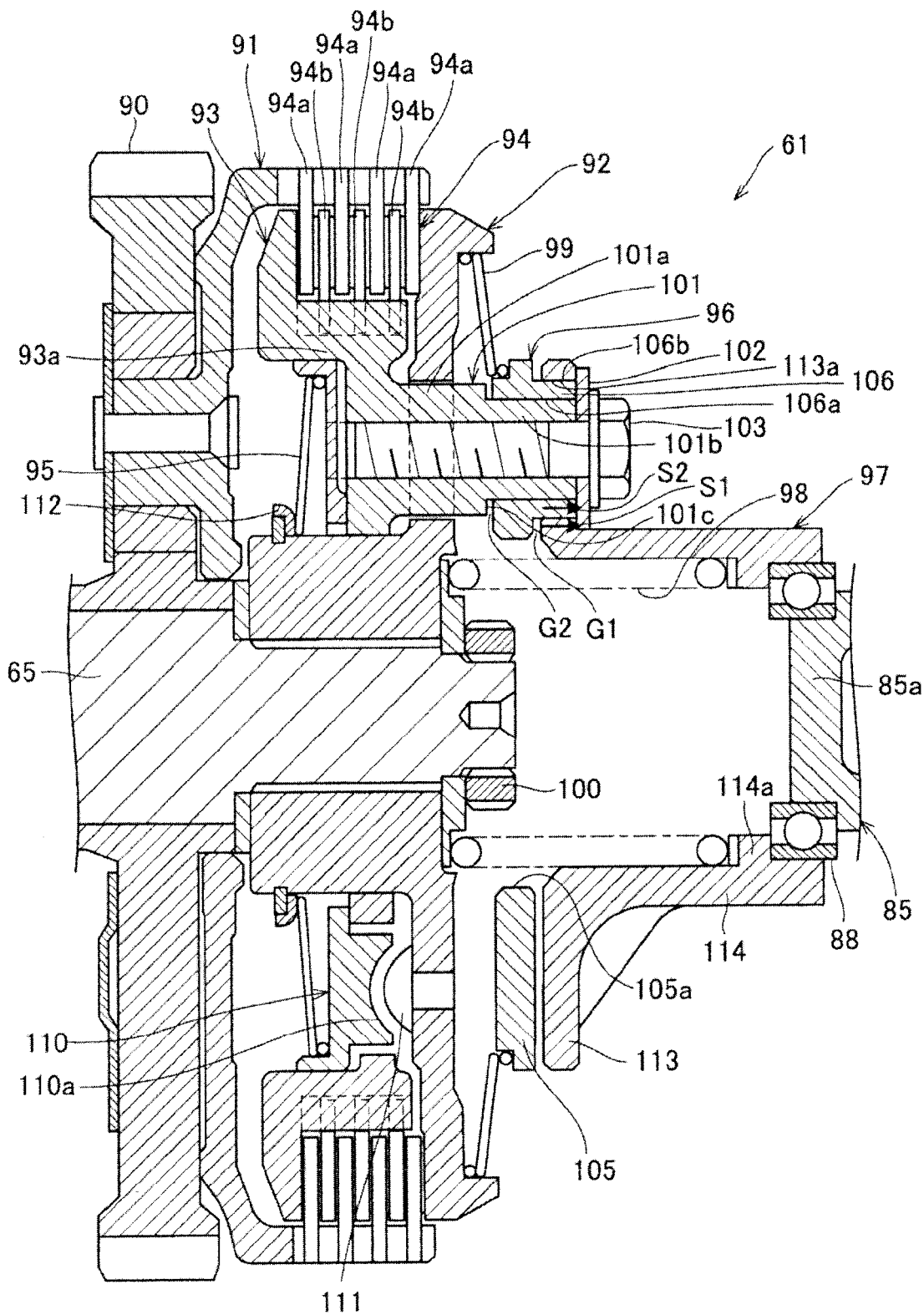
FIG. 5 is a sectional view of the change clutch.

FIG. 5 is a sectional view of the change clutch 61. Here, FIG. 5 illustrate a state in which the change clutch 61 has been completely engaged.

The change clutch 61 includes a cup-shaped clutch outer 91 fixed to the primary driven gear 90, and a disc-shaped clutch center 92 provided on a radially inner side of the clutch outer 91 and integrally fixed to the main shaft 65. A pressure plate 93 is provided on a radially inner side of the clutch outer 91 and is movable in the axial direction of the main shaft 65, and clutch discs 94 are provided between the pressure plate 93 and the clutch center 92. A main spring 95 biases the pressure plate 93 in a clutch-engaging direction. A lifter plate 96 is disposed between the clutch center 92 and the lifter cam plate 85, and a sub lifter plate 97 is disposed between the lifter plate 96 and the lifter cam plate 85.

In addition, the change clutch 61 includes a sub spring 98 retained between the clutch center 92 and the sub lifter plate 97. A second sub spring 99 is held between the clutch center 92 and the lifter plate 96, and a back torque limiting member 110 is provided.

The clutch center 92 and the pressure plate 93 are combined with each other to form an integral body, which constitutes a clutch inner disposed on the inside of the clutch outer 91.

The clutch outer 91 is integrally fixed onto an outside surface of the primary driven gear 90. The clutch outer 91 can be rotated relative to the main shaft 65, as one body with the primary driven gear 90.

The clutch center 92 is fixed by a nut 100 in the state of being spline-coupled to the main shaft 65. The clutch center 92 is non-rotatable and axially non-movable relative to the main shaft 65.

The pressure plate 93 is disposed on the inside of a cylindrical portion of the clutch outer 91, and is fitted to a shaft portion of the clutch center 92 so as to be movable in the axial direction. The pressure plate is provided with a plurality of cylindrical release bosses 101 which penetrate the clutch center 92 and are connected to the lifter plate 96.

The clutch discs 94 are clamped between the clutch center 92 and the pressure plate 93.

The clutch discs 94 include outside frictional discs 94a provided on the clutch outer 91, and inside frictional discs 94b provided on the clutch center 92. The outside frictional discs 94a and the inside frictional discs 94b are disposed in pluralities and in an alternately stacked state, between the pressure plate and the clutch center 92. Each of the outside frictional discs 94a is supported on the cylindrical portion of the clutch outer 91 through spline fitting, and is provided to be axially movable but non-rotatable relative to the clutch outer 91.

Each of the inside frictional discs 94b is supported on an outer circumferential portion of an inside cylindrical portion 93a of the pressure plate 93 through spline fitting, and is provided to be axially movable but non-rotatable relative to the pressure plate 93.

The back torque limiting member 110 is formed in a plate-like shape, and is fixed on the inside of the inside cylindrical portion 93a of the pressure plate 93 as one body with the pressure plate 93.

The back torque limiting member 110 and a lifter pin 111, which is fixed to the clutch center 92, constitute a back torque limiter mechanism. The back torque limiter mechanism is a known one as described, for example, in Japanese Patent Laid-Open No. 1996-93786. The back torque limiter mechanism is a mechanism which brings a clutch from an engaged state into a partial clutch engagement state in the case where a torque of not less than a predetermined value is exerted in a direction opposite to a forward power transmission direction.

The back torque limiting member 110 has a cam portion 110a which penetrates the pressure plate 93 to engage with the lifter pin 111. When a back torque of not less than a predetermined value acts from the rear wheel 13 side, the pressure plate 93 rotates relative to the clutch center 92, whereby the cam portion 110a is slid on the lifter pin 111, and the pressure plate 93 is moved in a clutch-disengaging direction. According to the back torque limiter mechanism, a shift shock arising from a back torque can be reduced.

The main spring 95 is retained between a retainer 112 provided on the clutch center 92 and the back torque limiting member 110. The main spring 95 biases the pressure plate 93 in a direction for clamping the clutch discs 94 between the pressure plate 93 and the clutch center 92, namely, in a clutch-engaging direction.

Each release boss 101 of the pressure plate 93 is provided at its tip portion with a guide shaft portion 101b formed to be smaller in diameter than a base end portion 101a. A stopper plate 102 larger in diameter than the guide shaft portion 101b is fastened to a tip surface of the guide shaft portion 101b by a bolt 103. The base end portion 101a is formed at its tip surface with a stepped portion 101c opposed to the stopper plate 102.

The lifter plate 96 includes a plate-shaped ring portion 105 opposed to the clutch center 92, and a spring passing hole 105a provided in the center of the ring portion 105. Lifter plate side bosses 106 project from the ring portion 105 toward the lifter cam plate 85 side.

A plurality of the lifter plate side bosses 106 are formed at substantially regular intervals along the circumferential direction of the lifter plate 96. Each lifter plate side boss 106 is formed in a cylindrical shape penetrating the ring portion 105. The lifter plate side boss 106 includes a hole 106a in which the guide shaft portion 101b of the release boss 101 is inserted, and an outer circumferential portion 106b to which the sub lifter plate 97 is fitted.

The lifter plate 96 is assembled with the lifter plate side bosses 106 slidably fitted in the guide shaft portions 101b of the release bosses 101. The lifter plate 96 is disposed between the stopper plate 102 and the stepped portion 101c.

The second sub spring 99 is clamped between an outside surface of the clutch center 92 and the lifter plate 96, biasing the lifter plate 96 so as to press the lifter plate 96 against the stopper plate 102 side. In a clutch engaged state, the lifter plate 96 is so disposed that a gap G2 is formed between its ring portion 105 and the stepped portion 101c, as the tip surface of the guide shaft portion 101b is put into contact with the stopper plate 102 by a biasing force of the second sub spring 99.

In other words, the second sub spring 99 is pressing the pressure plate 93 against the clutch center 92 side through the lifter plate 96 and the stopper plate 102, thereby biasing the pressure plate 93 in a clutch-engaging direction.

The sub lifter plate 97 includes a ring-shaped pressing plate portion 113 opposed to the lifter plate 96, and a cylindrical circular pipe-shaped portion 114 projecting from an inner circumferential edge at the center of the pressing plate portion 113 toward the lifter cam plate 85 side. The circular pipe-shaped portion 114 is provided substantially coaxially with the main shaft 65.

The pressing plate portion 113 is provided with holes 113a in which to fit the lifter plate side bosses 106 of the lifter plate 96. A plurality of the holes 113a are provided at positions corresponding to the respective lifter plate side bosses 106. The ball bearing 88 is fitted to a tip portion of the circular pipe-shaped portion 114.

The sub lifter plate 97 is assembled with the holes 113a slidably fitted to the lifter plate side bosses 106 of the lifter plate 96. The pressing plate portion 113 of the sub lifter plate 97 is disposed between the stopper plate 102 and the ring portion 105 of the lifter plate 96.

The sub spring 98 is retained between the clutch center 92 and a receiving portion 114a formed at the circular pipe-shaped portion 114 of the sub lifter plate 97, biasing the sub lifter plate 97 so as to press the sub lifter plate 97 against the stopper plate 102 side.

In a clutch engaged state, the sub lifter plate 97 has its pressing plate portion 113 put in contact with the stopper plate 102 by a biasing force of the sub spring 98, with a gap G1 formed between the pressing plate portion 113 and the ring portion 105.

In other words, the sub spring 98 is pressing the pressure plate 93 against the clutch center 92 side through the stopper plate 102, thereby biasing the pressure plate 93 in a clutch-engaging direction.

In a clutch engaged state as illustrated in FIG. 5, the clutch discs 94 are clamped by biasing forces of the main spring 95, the second sub spring 99 and the sub spring 98. In this state, the rotation of the clutch outer 91 rotated by the primary gear 47 can be transmitted through the clutch discs 94 to the clutch center 92, and the main shaft 94 is rotated as one body with the clutch center 92.

When the pressure plate 93 is moved toward the primary driven gear 90 side against the biasing forces of the main spring 95, the second sub spring 99 and the sub spring 98 through the lifter cam plate 85, the clamping of the clutch discs 94 is released, resulting in a clutch disengaged state.

Figure 6:
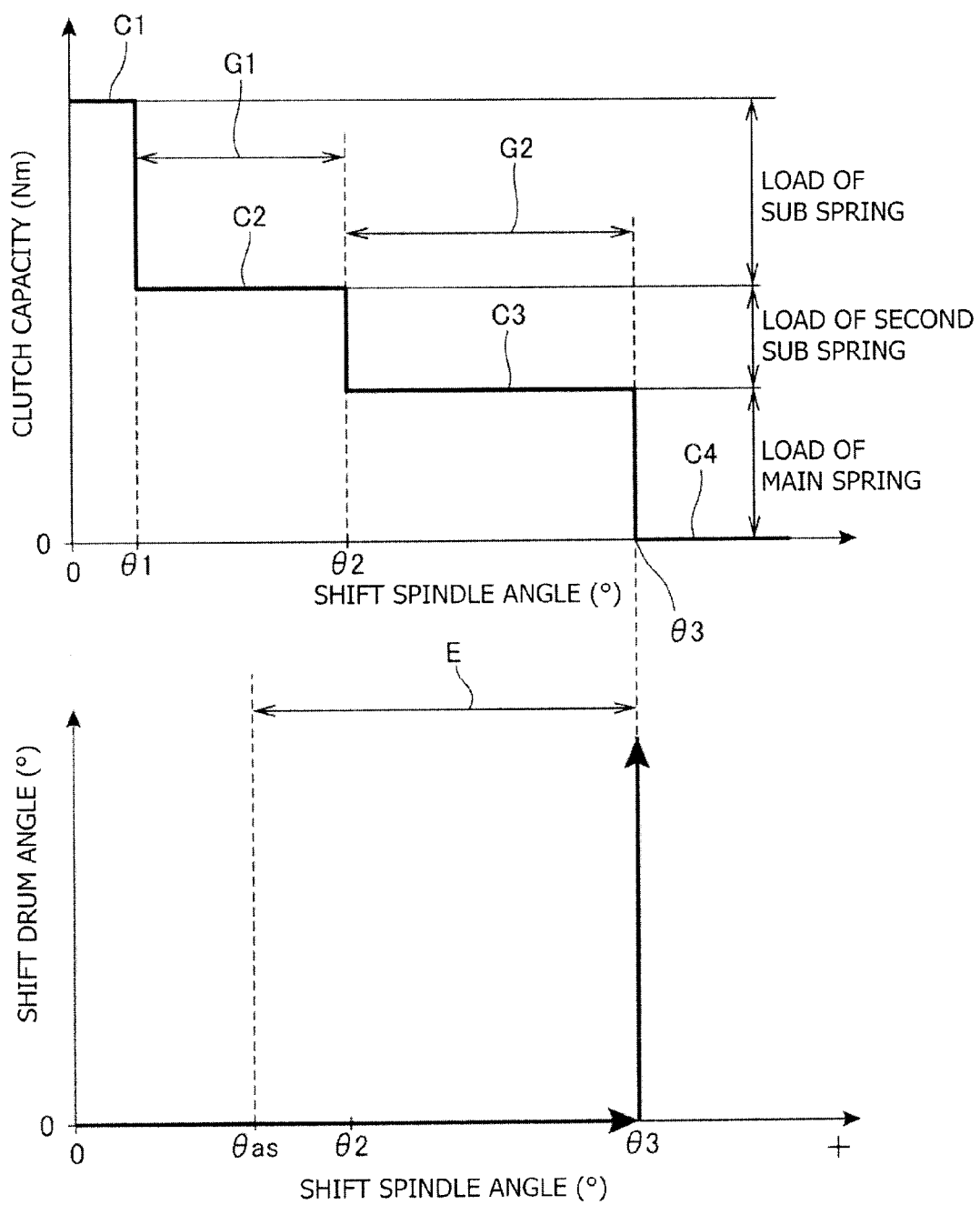
FIG. 6 is a diagram showing a clutch capacity of the change clutch and a rotational angle of a shift drum relative to a rotational angle of a shift spindle.

FIG. 6 is a diagram showing clutch capacity of the change clutch 61 and rotational angle of the shift drum 70 relative to rotational angle of the shift spindle 76. In the following description, a normal direction of rotation of the shift spindle 76 is the shift-up direction, and a negative direction of rotation of the shift spindle 76 is the shift-down direction.

As illustrated in FIG. 6, in this embodiment, the capacity of the change clutch 61 is variable as the springs contributing to the clutch capacity are changed according to the rotational angle of the shift spindle 76. Specifically, the clutch capacity is variable in a plurality of stages, including a maximum capacity C1 (clutch full capacity state) wherein the clutch capacity is determined by the biasing forces of the main spring 95, the second sub spring 99 and the sub spring 98. A first intermediate capacity C2 (partial clutch engagement state) is a stage wherein the clutch capacity is determined by the biasing forces of the main spring 95 and the second sub spring 99. A second intermediate capacity C3 is one wherein the clutch capacity is determined by the biasing force of only the main spring 95. A disengagement capacity C4 (clutch disengaged state) is one wherein the biasing force of the main spring 95 is completely removed. When having the first intermediate capacity C2 and when having the second intermediate capacity C3, the change clutch 61 is in a so-called partial clutch engagement state.

The maximum capacity C1 of the clutch capacity is obtained in the clutch engaged state depicted in FIG. 5. In this state, both the lifter plate 96 and the sub lifter plate 97 are in contact with the stopper plate 102, so that the biasing forces of the second sub spring 99 and the sub spring 98 are transmitted to the pressure plate 93. Therefore, the biasing force with which the pressure plate 93 presses the clutch discs 94 is a sum total of the biasing forces (loads) exerted by the main spring 95, the second sub spring 99 and the sub spring 98, and is at maximum.

In other words, the sub lifter plate 97 and the stopper plate 102 constitute a first sub spring load transmission path S1 along which the biasing force of the sub spring 98 is transmitted to the pressure plate 93. In addition, the lifter plate 96 and the stopper plate 102 constitute a second sub spring load transmission path S2 along which the biasing force of the second sub spring 99 is transmitted to the pressure plate 93.

When the lifter cam plate 85 is moved in a clutch-disengaging direction attendantly on the rotation of the shift spindle 76 by the actuator mechanism 64 (FIG. 2), the sub lifter plate 97 is lifted along the lifter plate side bosses 106 toward the ring portion 105 side against the biasing force of the sub spring 98, thereby being separated from the stopper plate 102.

With the angle of the shift spindle 76 being the rotational angle θ1 (FIG. 6) and with the sub lifter plate 97 separated from the stopper plate 102, the first sub spring load transmission path S1 is interrupted. In this state, the biasing force of the sub spring 98 is not transmitted to the pressure plate 93, and the clutch capacity is determined by the main spring 95 and the second sub spring 99. For this reason, as shown in FIG. 6, the clutch capacity is lowered from the maximum capacity C1 to the first intermediate capacity C2 the moment that the sub lifter plate 97 is separated from the stopper plate 102.

When the movement of the lifter cam plate 85 is continued after the sub lifter plate 97 is separated from the stopper plate 102, the sub lifter plate 97 continues moving further toward the ring portion 105 side so as to reduce the gap G1 (FIG. 5). The section from the separation of the pressing plate portion 113 of the sub lifter plate 97 from the stopper plate 102 to the contact thereof with the ring portion 105 is the section of the first intermediate capacity C2. In other words, the first intermediate capacity C2 is obtained in the section of lift amount of the lifter cam plate 85 corresponding to the magnitude of the gap G1.

In the section of the first intermediate capacity C2, the movement of the sub lifter plate 97 is a movement relative to the ring portion 105, and does not influence the loads of the main spring 95 and the second sub spring 99. For this reason, as shown in FIG. 6, in the section of the first intermediate capacity C2, the clutch capacity is determined by the main spring 95 and the second sub spring 99, and the first intermediate capacity C2 is constant. In the present embodiment, a play owing to the gap G1 is provided, so that the section in which the first intermediate capacity C2 is obtained can be elongated. Accordingly, the intermediate capacity of the clutch can be easily adjusted to a set point, without enhancing the accuracy of component parts or a control technique.

When the lifter cam plate 85 is lifted further in the clutch-disengaging direction from the state of the first intermediate capacity C2, the pressing plate portion 113 of the sub lifter plate 97 comes into contact with the ring portion 105, whereon the section of the first intermediate capacity C2 ends. Thereafter, when the lifter cam plate 85 is moved further in the clutch-disengaging direction, the lifter plate 96 is pressed through the sub lifter plate 97, and is lifted along the guide shaft portion 101b toward the stepped portion 101c side against the biasing force of the second sub spring 99, to be separated from the stopper plate 102.

With the angle of the shift spindle 76 being the rotational angle θ2 (FIG. 6) and with the tips of the lifter plate side bosses 106 of the lifter plate 96 separated from the stopper plate 102, the second sub spring load transmission path S2 is interrupted, resulting in that the biasing force of the second sub spring 99 is not transmitted to the pressure plate 93 any more. In this state, the clutch capacity is determined by only the main spring 95. For this reason, as shown in FIG. 6, the clutch capacity is lowered from the first intermediate capacity C2 to the second intermediate capacity C3 the moment that the lifter plate 96 is separated from the stopper plate 102.

When the movement of the lifter cam plate 85 is continued after the lifter plate 96 is separated from the stopper plate 102, the lifter plate 96 continues moving further toward the stepped portion 101c side so as to reduce the gap G2. The section from the separation of the lifter plate 96 from the stopper plate 102 to the contact thereof with the stepped portion 101c is the section of the second intermediate capacity C3. In other words, the second intermediate capacity C3 is obtained in the section of lift amount of the lifter cam plate 85 corresponding to the magnitude of the gap G2.

In the section of the second intermediate capacity C3, the movement of the lifter plate 96 is a movement relative to the stepped portion 101c, and does not influence the load of the main spring 95. For this reason, as shown in FIG. 6, in the section of the second intermediate capacity C3, the clutch capacity is determined by only the main spring 95, and the second intermediate capacity C3 is constant. In the present embodiment, a play owing to the gap G2 is provided, so that the section in which the second intermediate capacity C3 is obtained can be elongated. Accordingly, the intermediate capacity of the clutch can be easily adjusted to a set point, without enhancing the accuracy of component parts or a control technique.

When the lifter cam plate 85 is further lifted in the clutch-disengaging direction from the state of the second intermediate capacity C3, the lifter plate 96 comes into contact with the stepped portion 101c, whereon the section of the second intermediate capacity C3 ends. Thereafter, with the angle of the shift spindle 76 being the rotational angle θ3 (FIG. 6) and with the lifter cam plate 85 further moved in the clutch-disengaging direction, the pressure plate 93 is pressed through the sub lifter plate 97 and the lifter plate 96. As a result, the pressure plate 93 is moved in the clutch-disengaging direction against the biasing force of the main spring 95, so that the pressure plate 93 is separated from the clutch discs 94, and the clutch is disengaged.

At the time of an automatic shift, the control unit 17 selects a clutch capacity with which the shift shock can be reduced by driving the actuator mechanism 64 on the basis of the load on the engine 21. The selection of the clutch capacity can be performed by controlling the shift spindle 76 to a predetermined rotational angle. For example, at the time of shifting-up from the first speed to the second speed, the control unit 17 selects one of the clutch capacities so as to reduce the shift shock, on the basis of the pre-shift load on the engine 21 detected. Then, after changing the gear train in the transmission 60, the control unit 17 causes the change clutch 61 to be engaged at the selected clutch capacity.

By this control, the difference rotation between the main shaft 65 side and the crankshaft 23 side can be appropriately absorbed by the change clutch 61, and the shift shock can be reduced.

Figure 7:
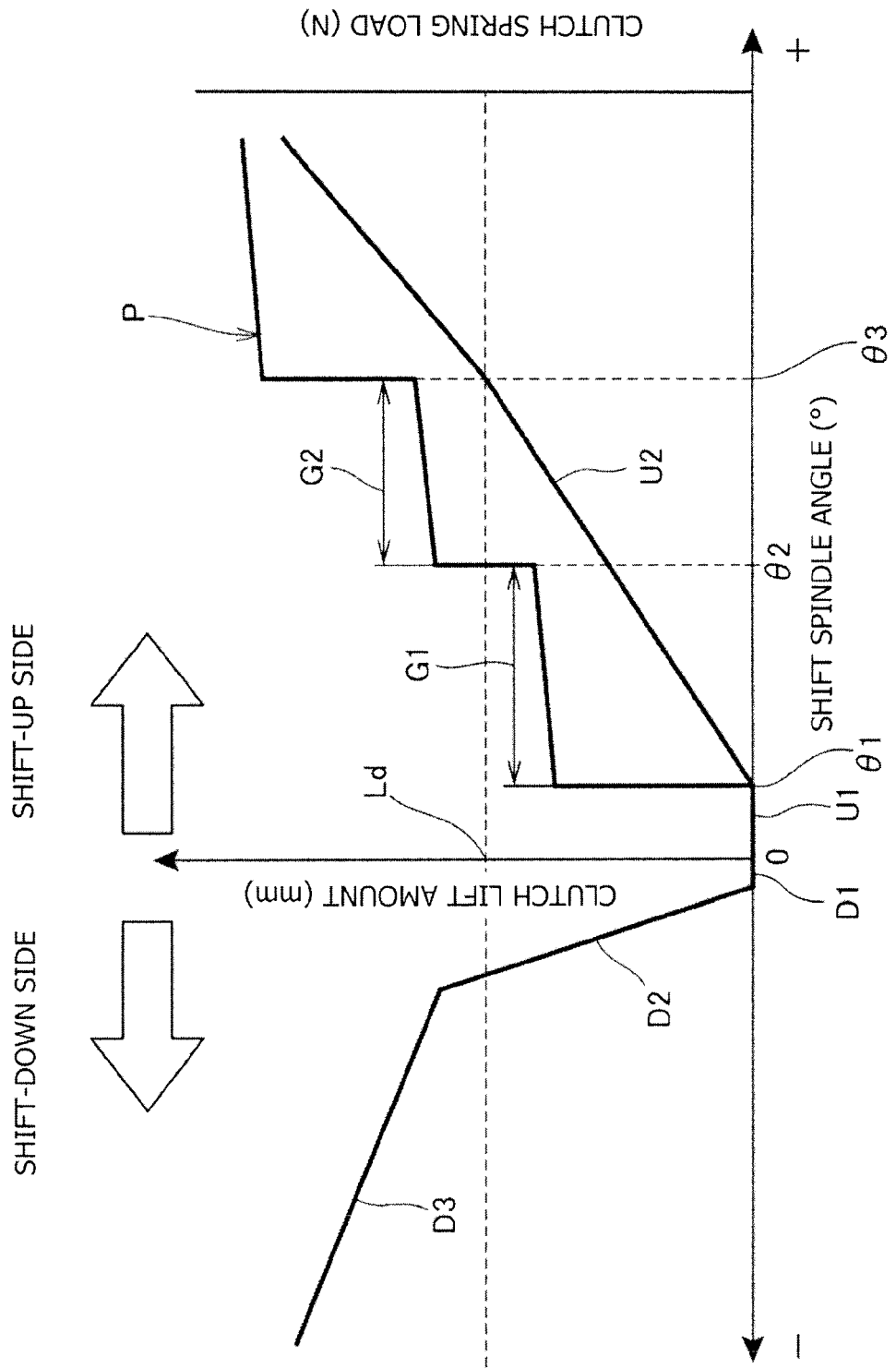
FIG. 7 is a diagram showing a lift amount of the lifter cam plate relative to the rotational angle of the shift spindle.

FIG. 7 is a diagram showing lift amount of the lifter cam plate 85 (clutch lift amount) relative to rotational angle of the shift spindle 76. Besides, in FIG. 7, on the shift-up side, load of the clutch spring relative to the rotational angle of the shift spindle 76 is shown.

As shown in FIG. 7, lift characteristics of the lifter cam plate 85 on the shift-up side include a play section U1 wherein the lift amount does not increase in response to rotation of the shift spindle 76 from a neutral position (0°) to a predetermined angle, and a lift section U2 wherein the lift amount increases substantially linearly with an increase in the rotational amount of the shift spindle 76.

Lift characteristics of the lifter cam plate 85 on the shift-down side include a play section D1 wherein the lift amount does not increase in response to rotation of the shift spindle 76 from the neutral position (0°) to a predetermined angle, a lift section D2 wherein the lift amount increases substantially linearly with an increase in the rotational angle of the shift spindle 76, and a lift section D3 wherein the lift amount increases substantially linearly, and at a gradient smaller than that in the lift section D2, with an increase in the rotational angle of the shift spindle 76.

The play section D1 is set smaller than the play section U1. In the lift section D2, the lift amount of the lifter cam plate 85 increases at a gradient greater than that in the lift section U2.

The lift characteristics of the lifter cam plate 85 are set to desired characteristics by regulating the shapes of the cam hole 85c of the lifter cam plate 85 and the cam hole 85c of the clutch lever 82. In the present embodiment, a setting is made such that the lift amount of the lifter cam plate 85 increases linearly with an increase in the rotational amount of the shift spindle 76.

Load P of the clutch spring on the shift-up side shown in FIG. 7 is a reaction force that the lifter cam plate 85 receives from the change clutch 61 when the shift spindle 76 is rotated in the shift-up direction, that is, a force required for progressively disengaging the change clutch 61. Since variations in the load P correspond to variations in the clutch capacity shown in FIG. 6, the corresponding sections are denoted by the same reference symbols as used above. The load P increases stepwise correspondingly to the stepwise reduction in the clutch capacity.

The rotational angle θ3 reached when the shift spindle 76 is rotated slightly in the clutch-disengaging direction after the gap G2 is reduced to zero is a rotational position of the shift spindle 76 at which the clutch is disengaged. The lift amount of the lifter cam plate 85 at the rotational angle θ3 is a disengagement lift amount Ld at which the clutch is disengaged.

The disengagement lift amount Ld is the same in both the shift-up direction and the shift-down direction. In the lift section D2, the lift amount of the lifter cam plate 85 increases more rapidly than in the lift section U2. Therefore, in the shift-down direction, the clutch is disengaged at a smaller rotational amount of the shift spindle 76 than that in the shift-up direction.

As shown in FIG. 6, at the time of shifting-up, accumulation of a force by the force accumulation mechanism 81 is started at a stage before disengagement of the clutch. At the rotational angle θ3, the clutch is disengaged, whereby restraint on the change mechanism 89 by the transmission 60 is released, and the shift drum 70 is rotated at a stroke by the force accumulated in the force accumulation mechanism 81, resulting in a shift-up. A force accumulation section E in which a force is accumulated in the force accumulation mechanism 81 is the section from a rotational angle Gas between the rotation angle θ1 and the rotational angle θ2 to the rotational angle θ3.

Figure 8:
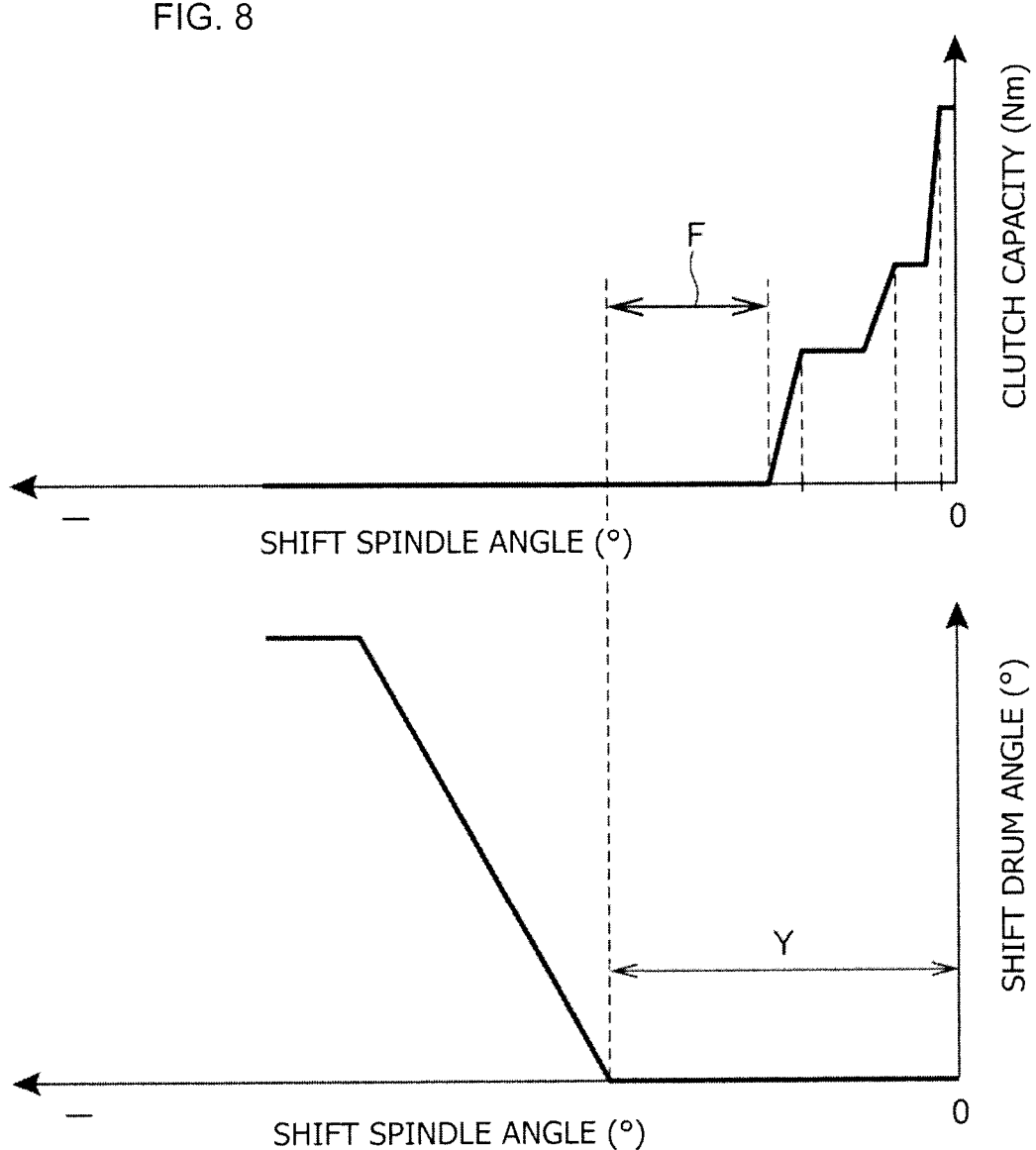
FIG. 8 is a diagram showing the clutch capacity of the change clutch and the rotational angle of the shift drum relative to the rotational angle of the shift spindle during a shift-down.

FIG. 8 is a diagram showing clutch capacity of the change clutch 61 and rotational angle of the shift drum 70 in relation to rotational angle of the shift spindle 76 at the time of shifting-down.

At the time of shifting-down, stepwise control of clutch capacity is not conducted, and, in response to rotation of the shift spindle 76, the change clutch 61 is disengaged to the disengagement capacity C4 at a stroke.

When the shift spindle 76 is rotated in the shift-down direction by a predetermined amount F after the change clutch 61 is completely disengaged, rotation of the shift drum 70 is started through the master arm 80, and a shift-down is performed.

The shift shock upon the shift-down is reduced by the back torque limiter mechanism.

Figure 9:
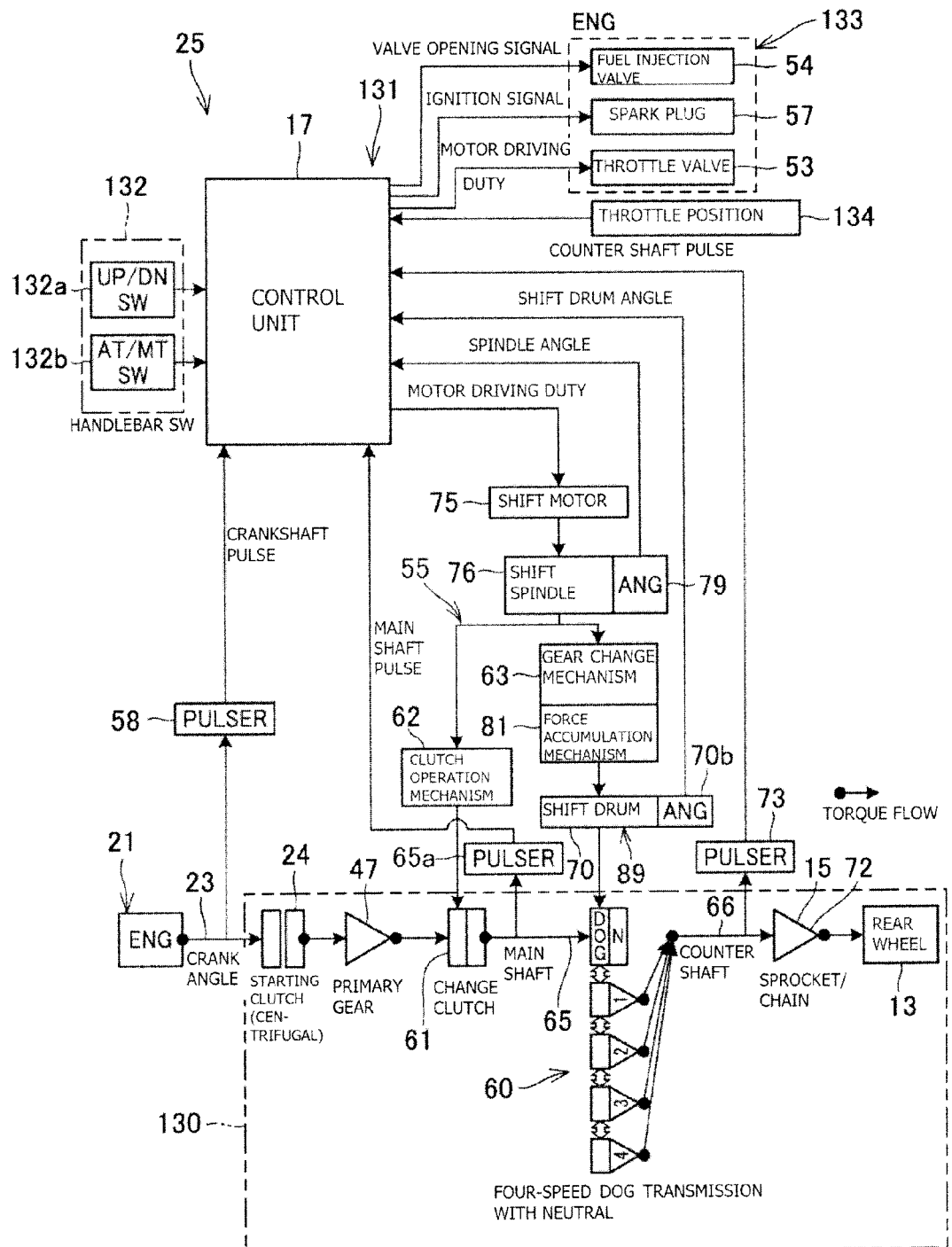
FIG. 9 is a block diagram showing the configuration of the automatic speed change apparatus.

FIG. 9 is a block diagram showing the configuration of the automatic speed change apparatus 25.

As shown in FIG. 9, the automatic speed change apparatus 25 includes a drive transmission unit 130 including the starting clutch 24, the primary gear 47, the change clutch 61, the main shaft 65, the transmission 60, the counter shaft 66, the chain 15, the drive sprocket 72 and the rear wheel 13. An actuator mechanical unit 55 is configured to mechanically operate the transmission 60 and the change clutch 61. An electrical unit 131 is provided, as is an engine operation control unit 133 configured to directly control the operation of the engine 21.

The drive transmission unit 130 mechanically transmits the power of the crankshaft 23 to the rear wheel 13.

The actuator mechanical unit 133 includes the shift motor 75, the shift spindle 76, the gear change mechanism 63, the force accumulation mechanism 81, the change mechanism 89, and the clutch operation mechanism 62.

The engine operation control unit 133 includes the throttle valve 53, the fuel injection valve 54, and a spark plug 57.

The throttle valve 53 is an electronically controlled one. Specifically, the throttle valve 53 is driven by a throttle valve driving motor (not shown) controlled by the control unit 17. More specifically, the control unit 17 detects, using a sensor, an operation amount of a throttle grip (not shown) provided on the handlebar 11 and operated by the driver, and drives the throttle valve driving motor according to the operation amount, thereby controlling the throttle position Th (engine load) of the throttle valve 53. The throttle valve 53 regulates the amount of air flowing through the intake pipe 52 to the engine 21.

The spark plug 57 is connected to the control unit 17 through an ignition coil driving portion and an ignition coil (both not shown). The control unit 17 controls ignition at the spark plug 57 so as to ignite a fuel-air mixture supplied to the engine 21.

The electrical unit 131 includes the control unit 17, an engine rotational speed sensor 58 (engine rotational speed detection means), the shift spindle angle sensor 79, a drum angle sensor 70b, a throttle position sensor 134 (engine load detection means), the counter shaft rotational speed sensor 73, the main shaft rotational speed sensor 65a, and a handlebar switch 132 provided on the handlebar 11.

The control unit 17 includes a CPU, and a storage section including a ROM, a RAM and the like. On the basis of control data such as a control map in the storage section, the control unit 17 controls the actuator mechanical unit 55 and the engine operation control unit 133. Note that the control unit 17 may be configured as a single unit or may be configured to be dividable into a plurality of component parts.

The engine rotational speed sensor 58 outputs a rotational speed Ne (FIG. 20) of the engine 21 to the control unit 17. Specifically, the rotational speed Ne is the rotational speed of the crankshaft 23.

The control unit 17 can determine the state of the transmission 60, that is, whether the transmission 60 is being shifted or not, on the basis of the value detected by the shift spindle angle sensor 79.

The drum angle sensor 70b outputs the rotational angle of the shift drum 70 to the control unit 17. On the basis of the rotational angle, the control unit 17 determines the current gear position (current shift position).

The throttle position sensor 134 outputs the throttle position Th of the throttle valve 53 to the control unit 17. The throttle position Th corresponds to the load on the engine 21, and the control unit 17 acquires the load of the engine 21 from the throttle position Th.

The handlebar switch 132 includes the mode switch 132b and the shift selection switch 132a.

On the basis of signals from the engine rotational speed sensor 58, the shift spindle angle sensor 79, the drum angle sensor 70b, the throttle position sensor 134, and the counter shaft rotational speed sensor 73, the control unit 17 controls the shift motor 75 to automatically perform a shift operation and a clutch operation.

In addition, the control unit 17 controls the throttle position Th, the injection amount of the fuel injection valve 54, and the ignition timing of the spark plug 57, according to the operation amount of the throttle grip. In this case, the control unit 17 corrects the position of the throttle valve 53, the injection amount of the fuel injection valve 54, and the ignition timing of the spark plug 57, on the basis of values detected by the throttle position sensor 134, the engine rotational speed sensor 58, the shift spindle angle sensor 79, the drum angle sensor 70b, and the counter shaft rotational speed sensor 73.

Figure 10:
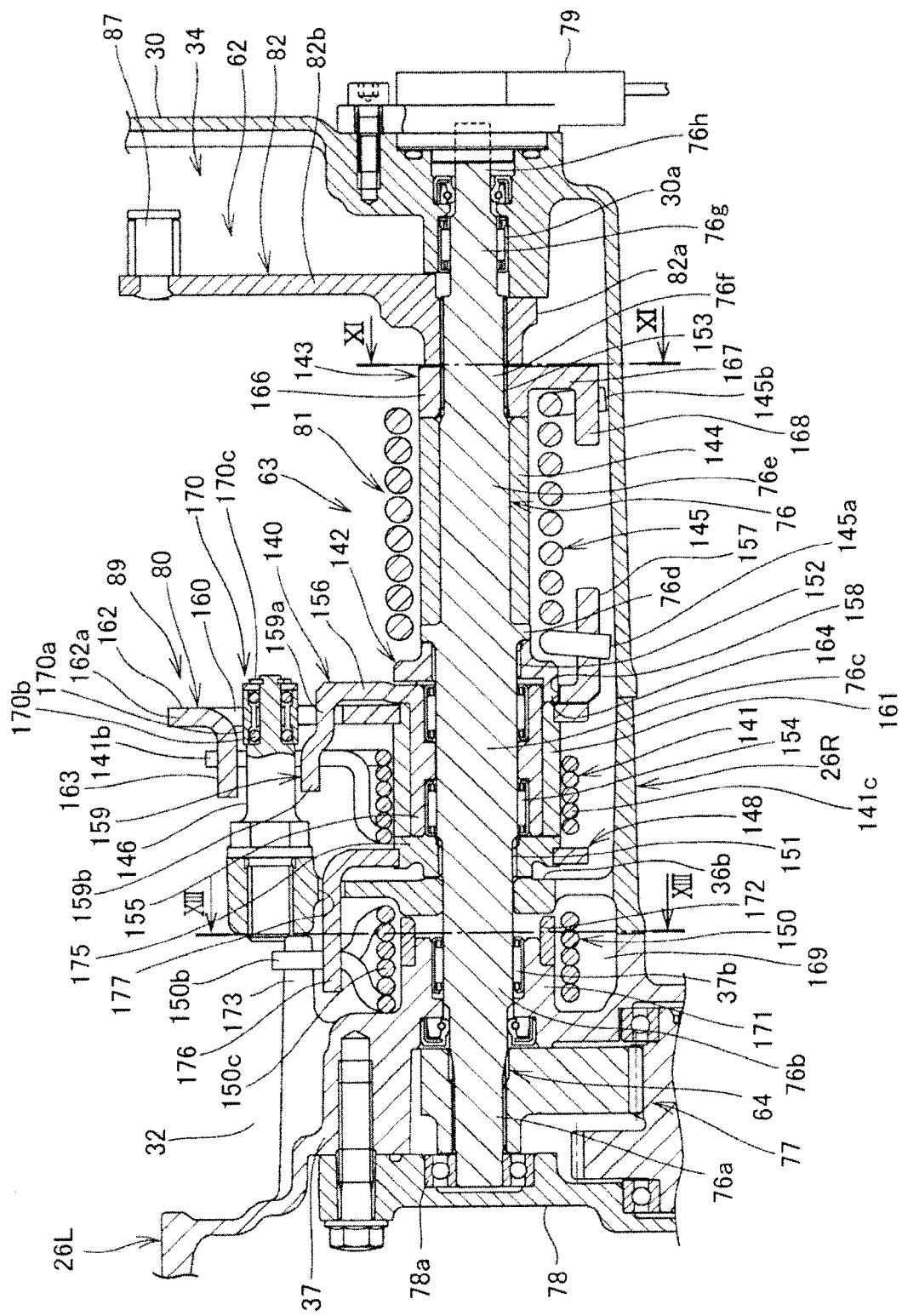
FIG. 10 is a sectional view of a force accumulation mechanism.

FIG. 10 is a sectional view of the force accumulation mechanism 81.

The wall portion 36 of the other-side case half 26R is provided, in the periphery of the shift spindle 76, with an inner wall 36b (inner wall near the faying portion) formed in the vicinity of the faying surface 26F of the crankcase 26.

The force accumulation mechanism 81 is disposed between the inner wall 36b of the wall portion 36 of the other-side case half 26R and the clutch cover 30.

The force accumulation mechanism 81 includes the shift spindle 76, and a gear shift arm 140 provided on a shaft of the shift spindle 76 so as to be rotatable relative to the shift spindle 76. A return spring 141 biases the gear shift arm 140 toward a neutral position. A shift-down collar 142 is fixed on the shaft of the shift spindle 76 at a position proximate to the gear shift arm 140 and rotated as one body with the shift spindle 76, and a force accumulation collar 143 is fixed on the shaft of the shift spindle 76 at a position spaced axially from the gear shift arm 140 and rotated as one body with the shift spindle 76.

In addition, the force accumulation mechanism 81 includes a spring collar 144 provided on the shaft of the shift spindle 76 between the force accumulation collar 143 and the gear shift arm 140 so as to be rotatable relative to the shift spindle 76. A force accumulation spring 145 is wound around the outer circumference of the spring collar 144 between the force accumulation collar 143 and the gear shift arm 140, and a stopper pin 146 (stopper portion) is configured to restrict the rotational position of the master arm 80.

The gear change mechanism 63 includes a sub return spring locking collar 148 fixed on the shift spindle 76 adjacently to the force accumulation mechanism 81, and a sub return spring 150 connected to the sub return spring locking collar 148 and biasing the shift spindle 76 toward a neutral position.

The shift spindle 76 includes a connection portion 76a connected to the speed reduction gear train 77, and a support portion 76b supported by the bearing portion 37a and penetrating the inner wall 36b. A gear shift arm support portion 76c supports the gear shift arm 140, and a flange portion 76d projects radially. A spring collar support portion 76e supports the spring collar 144, and a collar support portion 76f supports the force accumulation collar 143. A support portion 76g is supported by the bearing 30a, and a sensor connection portion 76h is connected to the shift spindle angle sensor 79. These elements are arranged in order from the cover 78 side.

Of the shift spindle 76, the flange portion 76d is the largest in diameter, while the gear shift arm support portion 76c, the support portion 76b, and the connection portion 76a are formed to be reduced stepwise in diameter toward the side of the connection portion 76a. In addition, the spring collar support portion 76e, the collar support portion 76f, the support portion 76g, and the sensor connection portion 76h are formed to be reduced stepwise in diameter from the flange portion 76d side toward the sensor connection portion 76h.

The support portion 76b is provided with a locking collar fixing portion 151 to which the sub return spring locking collar 148 is fixed. The gear shift arm support portion 76c is provided, at a position adjacent to the flange portion 76d, with a shift-down collar fixing portion 152 to which the shift-down collar 142 is fixed. The collar support portion 76f is provided with a force accumulation collar fixing portion 153 to which the force accumulation collar 143 is fixed. The locking collar fixing portion 151, the shift-down collar fixing portion 152, and the force accumulation collar fixing portion 153 are serrations formed at an outer circumference of the shift spindle 76. Besides, the clutch lever 82 is fixed to the force accumulation collar fixing portion 153.

The sub return spring locking collar 148, the shift-down collar 142, the force accumulation collar 143, and the clutch lever 82 are fixed to be non-rotatable relative to the shift spindle 76, and are each rotated as one body with the shift spindle 76.

Figure 11:
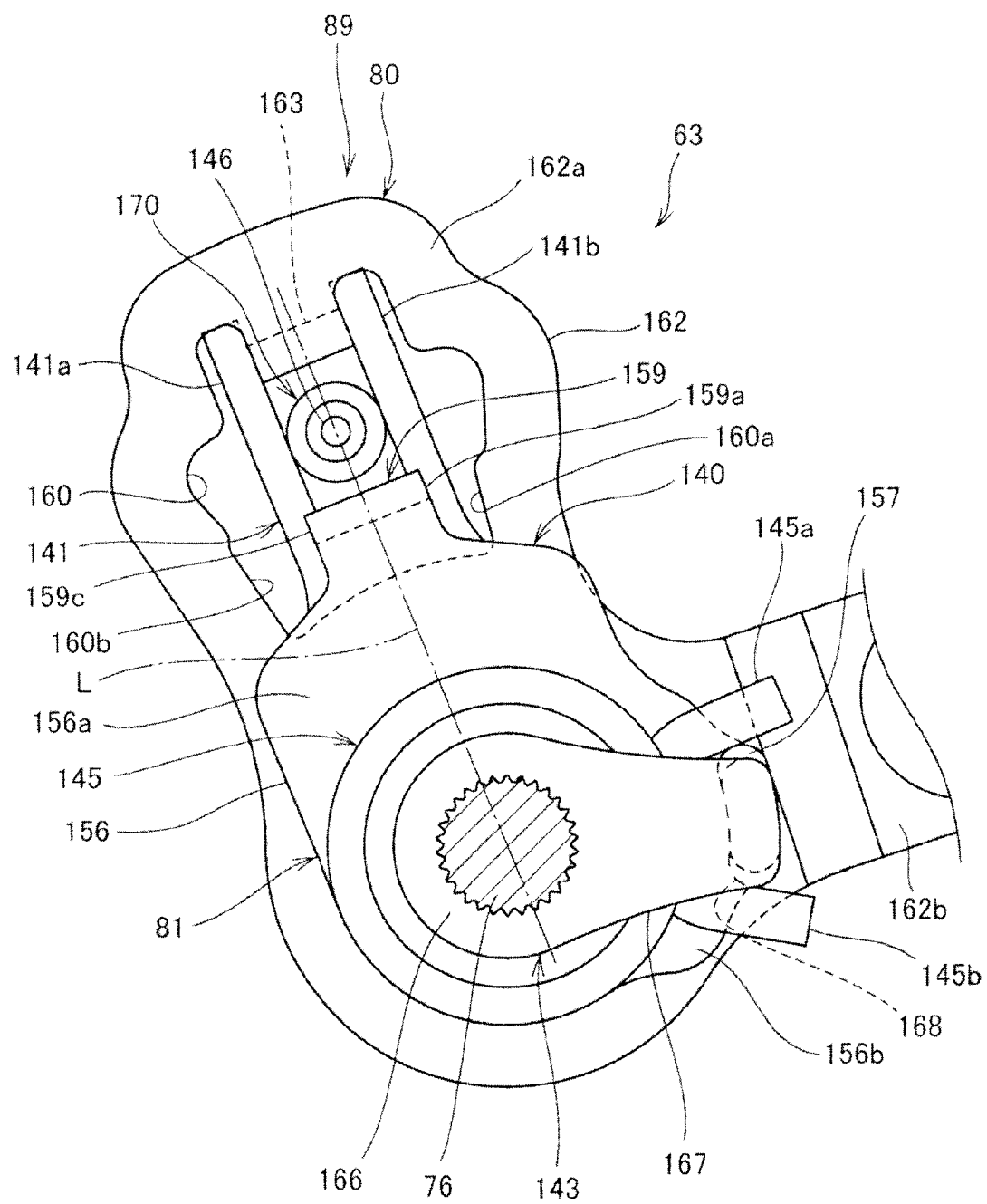
FIG. 11 is a sectional view taken along line XI-XI of FIG. 10, showing a peripheral part of the force accumulation mechanism.
Figure 12:
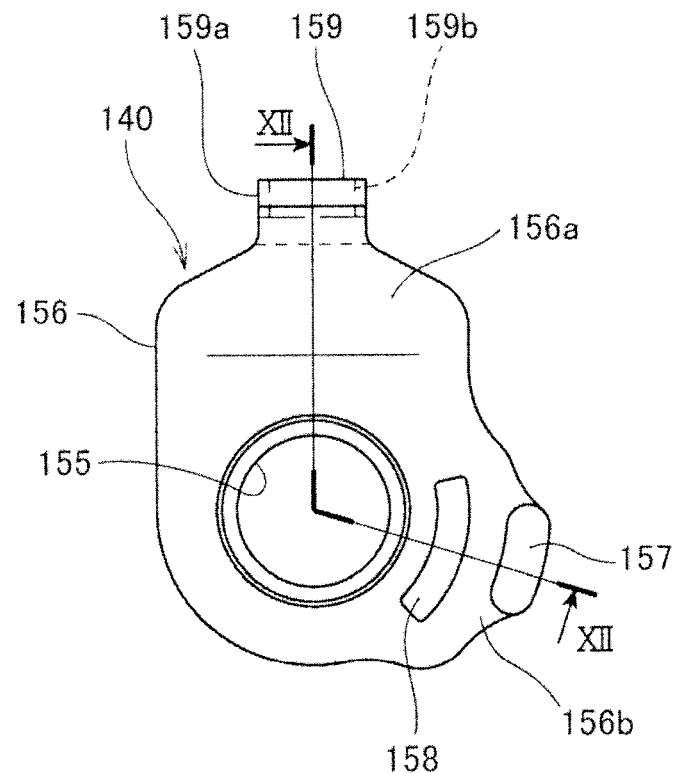
FIGS. 12(a) and 12(b) illustrate a gear shift arm, wherein 12(a) is a front view, and 12(b) is a sectional view taken along line XII-XII of 12(a).
Figure 12:
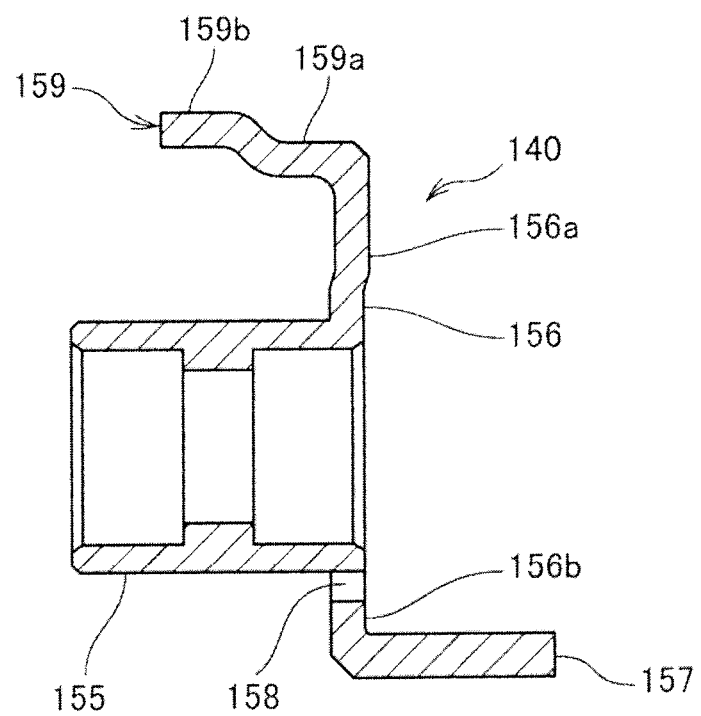

FIG. 11 is a sectional view taken along line XI-XI of FIG. 10, showing a peripheral part of the force accumulation mechanism 81. FIGS. 12(a) and 12(b) illustrate the gear shift arm 140, wherein 12(a) is a front view, and 12(b) is a sectional view taken along line XII-XII of 12(a). Here, in FIG. 11, the actuator mechanism 64, the force accumulation mechanism 81 and the change mechanism 89 are each in a neutral state (neutral position) in which neither shifting-up nor shifting-down is being conducted. In other words, in FIG. 11, the shift spindle 76, the gear shift arm 140, the master arm 80 and the like are in their neutral state. In addition, the clutch cover 30 is not depicted in FIG. 11.

As shown in FIGS. 10, 11, 12(a), and 12(b), the gear shift arm 140 includes a cylindrical portion 155 and a plate portion 156. The cylindrical portion 155 is fitted to an outer circumferential surface of the shift spindle 76 through a bearing 154. The plate portion 156 extends radially outward from an outer circumferential portion of an end, on the force accumulation spring 145 side, of the cylindrical portion 155.

The plate portion 156 includes an upward extension portion 156a extending upward from the cylindrical portion 155, and an extension portion 156b extending from the cylindrical portion 155 in a direction substantially orthogonal to the upward extension portion 156a.

The extension portion 156b is provided with a first locking piece 157 extending substantially in parallel to the shift spindle 76 from a tip portion of the extension portion 156b toward the force accumulation spring 145 side. In addition, the plate portion 156 is provided, between the cylindrical portion 155 and the first locking piece 157, with a hole 158 in which part of the shift-down collar 142 is fitted. The hole 158 is an arc-shaped slot extending along the cylindrical portion 155.

The upward extension portion 156a is provided with a second locking piece 159 which extends radially outward from a tip portion of the upward extension portion 156a and then extends substantially in parallel to the shift spindle 76 toward the return spring 141 side.

The second locking piece 159 includes a base end side contact portion 159a passed through a restriction opening 160 of the master arm 80; and a tip-side return spring locking portion 159b to which the return spring 141 is fixed. The return spring locking portion 159b is formed to be slenderer than the contact portion 159a.

The master arm 80 includes a cylindrical portion 161 and an arm portion 162. The cylindrical portion 161 is slidably fitted to an outer circumferential surface of the cylindrical portion 155 of the gear shift arm 140. The arm portion 162 extends radially outward from an end, on the force accumulation spring 145 side, of the cylindrical portion 161. The master arm 80 is rotatable relative to the gear shift arm 140. The master arm 80 is disposed so that the arm portion 162 is proximate to the plate portion 156 of the gear shift arm 140.

The arm portion 162 is formed in a roughly L shape in front view shown in FIG. 11. The arm portion 162 includes a position restriction arm 162a extending upward from the cylindrical portion 161, and an operation arm 162b extending from the cylindrical portion 161 in a direction substantially orthogonal to the position restriction arm 162a. The master arm 80 is connected to the shift drum 70 through the operation arm 162b. Rotation of the master arm 80 rotates the shift drum 70.

The master arm 80 is provided, at a tip portion of the position restriction arm 162a, with the restriction opening 160 through which the stopper pin 146 is passed. The second locking piece 159 of the gear shift arm 140 is passed through the restriction opening 160, at a position downwardly of the stopper pin 146. The restriction opening 160 has a predetermined width such that the stopper pin 146 and the second locking piece 159 can be moved relative to and within the restriction opening 160.

The master arm 80 is provided, at an upper edge portion of the restriction opening 160, with a spring locking piece 163 extending substantially in parallel to the shift spindle 76 toward the return spring 141 side.

The shift-down collar 142 is formed in a cylindrical shape, is axially positioned by abutment on the flange portion 76d, and is fixed to the shift-down collar fixing portion 152. The shift-down collar 142 has a dog tooth 164 inserted in the hole 158 in the gear shift arm 140. The whole length of the dog tooth 164 is set shorter than the whole length of the hole 158 so that the dog tooth 164 can move within the hole 158.

The force accumulation collar 143 includes a cylindrical portion 166 fixed to the force accumulation collar fixing portion 153, and an extension portion 167 extending radially outward from the cylindrical portion 166. A force accumulation arm 168 extends substantially in parallel to the shift spindle 76 from the tip of the extension portion 167 toward the gear shift arm 140 side. As viewed in the axial direction of the shift spindle 76, the force accumulation arm 168 is disposed at substantially the same position, radially and circumferentially, as the first locking piece 157 of the gear shift arm 140. Specifically, the force accumulation arm 168 is provided at a position slightly deviated from the first locking piece 157 in the circumferential direction.

The spring collar 144 is disposed between the flange portion 76d and the force accumulation collar 143. The spring collar 144 rotates relative to the shift spindle 76 when the inner circumferential portion of the force accumulation spring 145 makes contact with the spring collar 144, thereby reducing the friction on the force accumulation spring 145.

The force accumulation spring 145 is a torsion coil spring. A gear shift arm side end portion 145a at one end of the force accumulation spring 145 is locked onto the first locking piece 157 of the gear shift arm 140. A force accumulation arm side end portion 145b at the other end of the force accumulation spring 145 is locked onto the force accumulation arm 168 of the force accumulation collar 143.

The return spring 141 is a torsion coil spring, a coil portion 141c of which is fitted to an outer circumferential portion of the cylindrical portion 161 of the master arm 80.

The return spring 141 has its one end 141a and other end 141b extending radially outward. The one end 141a and the other end 141b are provided to be substantially parallel to each other, with a predetermined spacing therebetween.

The return spring 141 is disposed in a state in which the stopper pin 146 is interposed between its one end 141a and its other end 141b.

In addition, the spring locking piece 163 of the master arm 80 is clamped between the one end 141a and the other end 141b, on the more tip side of the one end 141a and the other end 141b than the stopper pin 146. The second locking piece 159 of the gear shift arm 140 is retained between the one end 141a and the other end 141b, on the more base end side of the one end 141a and the other end 141b than the stopper pin 146.

The stopper pin 146 is fixed by fastening to the inner wall 36b of the other-side case half 26R. The stopper pin 146 extends substantially in parallel to the shift spindle 76, and is passed through the restriction opening 160 of the master arm 80. The stopper pin 146 is provided with a damper portion 170 at a tip portion thereof. The damper portion 170 includes: a cylindrical collar 170a fitted to the stopper pin 146; an elastic member 170b such as rubber interposed between the collar 170a and the stopper pin 146; and a washer-shaped fixture 170c fitted to the tip of the stopper pin 146 so as to prevent the collar 170a from slipping off. An inner circumferential portion of the restriction opening 160 of the master arm 80 comes into contact with the damper portion 170 when the master arm 80 is rotated. Therefore, an impact sound generated when the restriction opening 160 is received by the stopper pin 146 can be reduced by the damper portion 170.

Figure 13:
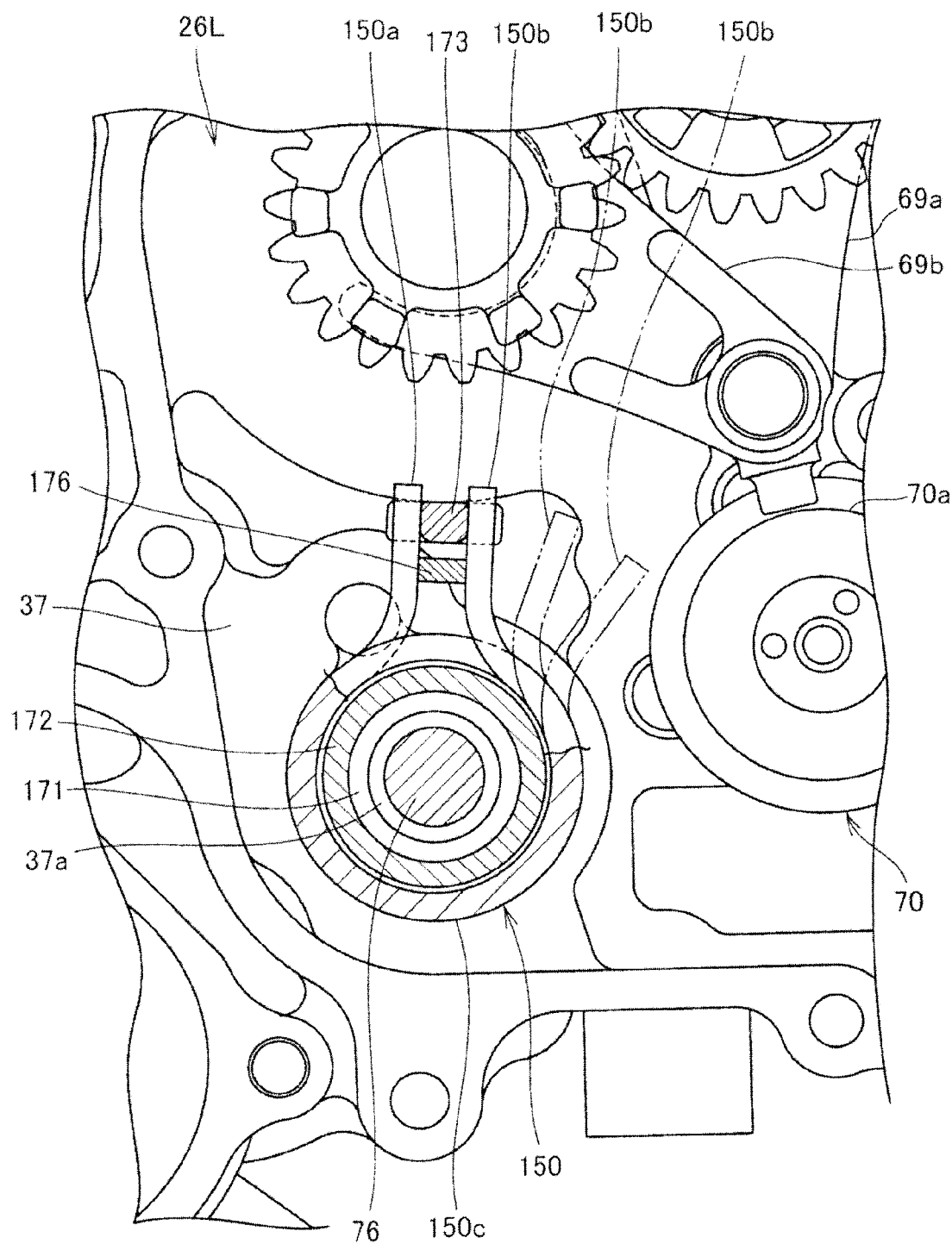
FIG. 13 is a sectional view taken along line XIII-XIII of FIG. 10.
Figure 14:
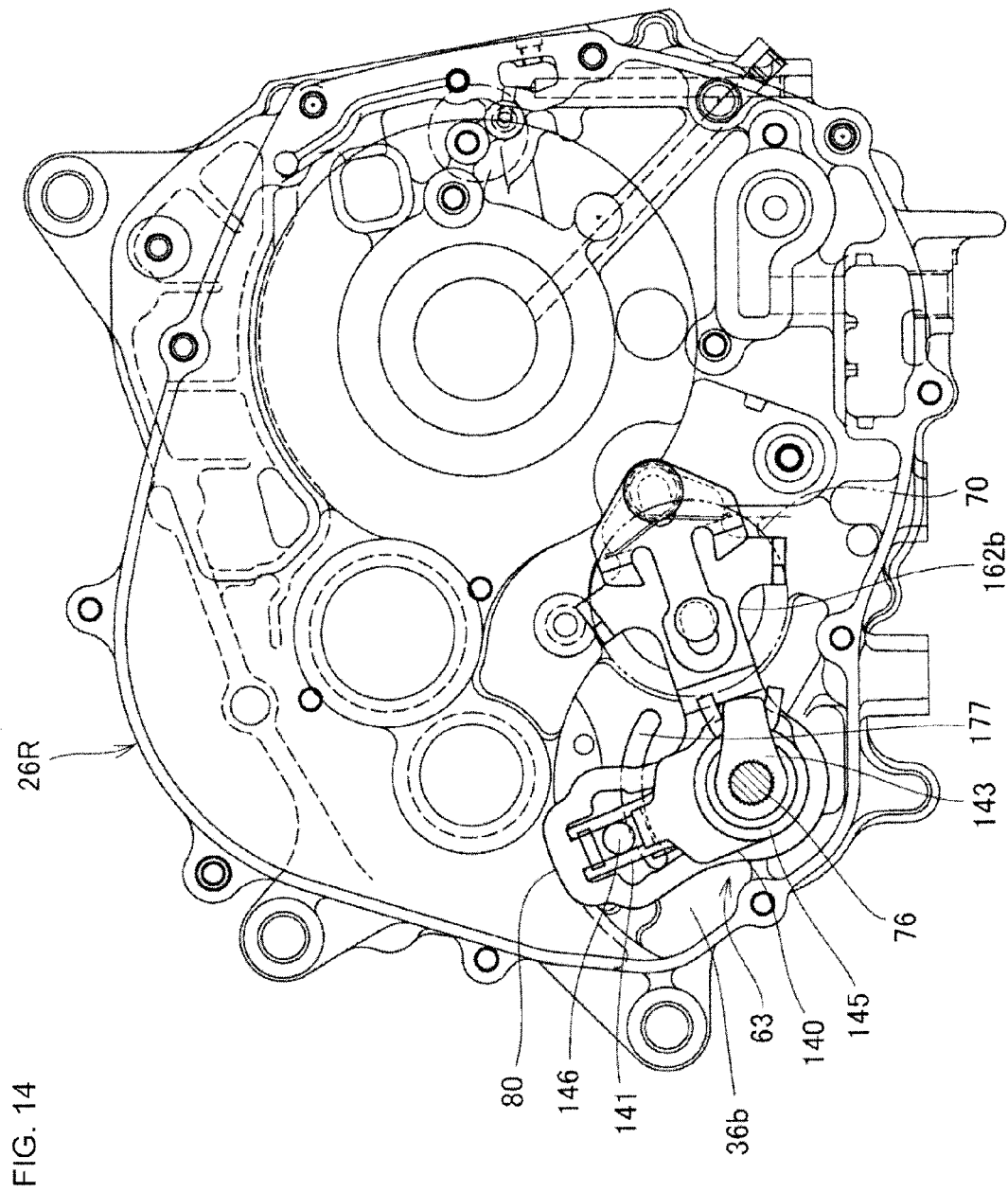
FIG. 14 is a sectional view taken along line XI-XI of FIG. 10.

FIG. 13 is a sectional view taken alone line XIII-XIII of FIG. 10. FIG. 14 is a sectional view taken along line XI-XI of FIG. 10. Here, FIG. 13 illustrates a neutral state. The clutch cover 30 is not shown in FIG. 14.

As shown in FIG. 10, the wall portion 37 of the one-side case half 26L is located on the outer side of the inner wall 36b of the other-side case half 26R. In a space 169 inside the transmission chamber 32 between the wall portion 37 and the inner wall 36b, there is provided a cylindrical sub return spring support portion 171 which projects along the shift spindle 76 from the wall portion toward the inner wall 36b side. The bearing 37b supporting the shift spindle 76 is supported on an inner circumferential portion of the sub return spring support portion 171.

At the tip of the sub return spring support portion 171, there is provided a stepped portion which is hollowed in the circumferential direction. A cylindrical guide collar 172 is fixed to the stepped portion. An outer circumferential portion of the guide collar 172 and an outer circumferential portion of a base end portion of the sub return spring support portion 171 are flush with each other.

The wall portion 37 is provided, in the vicinity of the sub return spring support portion 171, with a boss 173 extending substantially in parallel to the shift spindle 76. The boss 173 and the sub return spring support portion 171 are formed to be integral with the wall portion 37, and their tip portions extend into the vicinity of the inner wall 36b.

The sub return spring 150 is a torsion coil spring. The sub return spring 150 includes a coil portion 150c, and one end 150a and the other end 150b projecting radially outward from both ends of the coil portion 150c, respectively.

The sub return spring 150 is supported by fitting of an inner circumferential portion of the coil portion 150c to an outer circumferential portion of the sub return spring support portion 171, and is disposed in the space 169.

The sub return spring 150 is disposed in a state in which the boss 173 is clamped between its one end 150a and its other end 150b. The sub return spring 150 is circumferentially positioned by the boss 173.

As illustrated in FIGS. 10 and 13, the sub return spring locking collar 148 is disposed between the inner wall 36b of the other-side case half 26R and the master arm 80, and is located inside the clutch chamber 34. In addition, the sub return spring locking collar 148 is located between the inner wall 36b and the return spring 141.

The sub return spring locking collar 148 includes a cylindrical portion 175 and an arm portion 176. The cylindrical portion 175 is fixed to the locking collar fixing portion 151 of the shift spindle 76. The arm portion 176 extends radially outward from the cylindrical portion 175, then bends to a side opposite to the return spring 141, and extends toward the sub return spring 150 side.

The inner wall 36b is provided with a hole 177 through which the arm portion 176 of the sub return spring locking collar 148 is passed. The hole 177 is formed in an arcuate shape corresponding to a rotational trajectory of the arm portion 176. The arm portion 176 is passed through the hole 177 to extend into the space 169, and is clamped between the one end 150a and the other end 150b of the sub return spring 150 at a position between the boss 173 and the coil portion 150c.

In the neutral state shown in FIG. 11, the change clutch 61 is in an engaged state, and a driving force is generated in the transmission 60. Therefore, the master arm 80 is arrested by the transmission 60 and is non-rotatable on the shift spindle 76.

In the neutral condition, the master arm 80 has its spring locking piece 163 clamped between the one end 141a and the other end 141b of the return spring 141, whereby the rotational position of the master arm 80 is restricted to a neutral position. The return spring 141 restricts the rotational position of the master arm 80 in a state in which a predetermined initial load is exerted thereon.

In the neutral state, the gear shift arm 140 has its return spring locking portion 159b clamped between the one end 141a and the other end 141b of the return spring 141, whereby the rotational position of the gear shift arm 140 is restricted to a neutral position. The return spring 141 restricts the rotational position of the gear shift arm 140 in a state in which the predetermined initial load is exerted thereon.

In other words, in the neutral condition, the master arm 80 and the gear shift arm 140 are so located as to be along a straight line L passing through the center of the shift spindle 76 and the center of the stopper pin 146.

In the neutral condition, the force accumulation spring 145 is provided in a state in which an initial bend corresponding to a predetermined torsion amount is imparted thereto between the force accumulation arm 168 and the first locking piece 157. In this state, a predetermined initial load is generated in the force accumulation spring 145.

As shown in FIG. 13, in the neutral condition, the sub return spring locking collar 148 has its arm portion 176 clamped between the one end 150a and the other end 150b of the sub return spring 150, whereby rotational position of the sub return spring locking collar 148 is restricted to a neutral position. The sub return spring 150 restricts the rotational position of the sub return spring fixing collar 148 in a state in which a predetermined initial load is exerted thereon.

FIGS. 15(a)-15(d) illustrate positional states of the dog tooth 164 of the shift-down collar 142, wherein 15(a) shows a neutral state, and 15(b) to 15(d) show respective states of sequentially increased rotational amounts of the shift spindle 76.

Figure 15A:
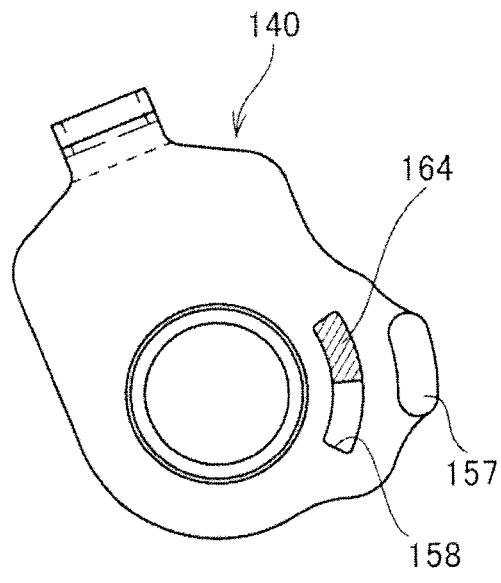
FIGS. 15(a)-15(d) illustrate positional states of a dog tooth of a shift-down collar, wherein 15(a) shows a neutral state, and 15(b) to 15(d) show states of sequentially increased rotational amounts of the shift spindle.
Figure 15:
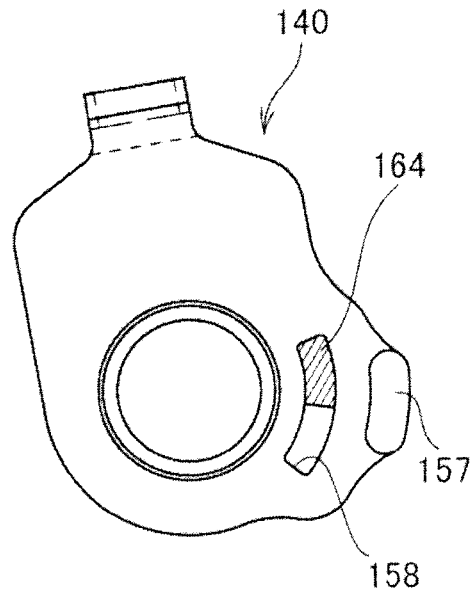

As shown in FIG. 15(a), in the neutral state, the dog tooth 164 is in contact with one end of the hole 158 of the gear shift arm 140, with a gap formed between the dog tooth 164 and the other end of the hole 158.

Here, an operation of the force accumulation mechanism 81 at the time of shifting-up will be described.

When the shift motor 75 of the actuator mechanism 64 is driven in response to a shift command from the control unit 17, rotation of the shift spindle 76 is started. The shift-up direction is the clockwise direction indicated by symbol UP in the figure.

Figure 16:
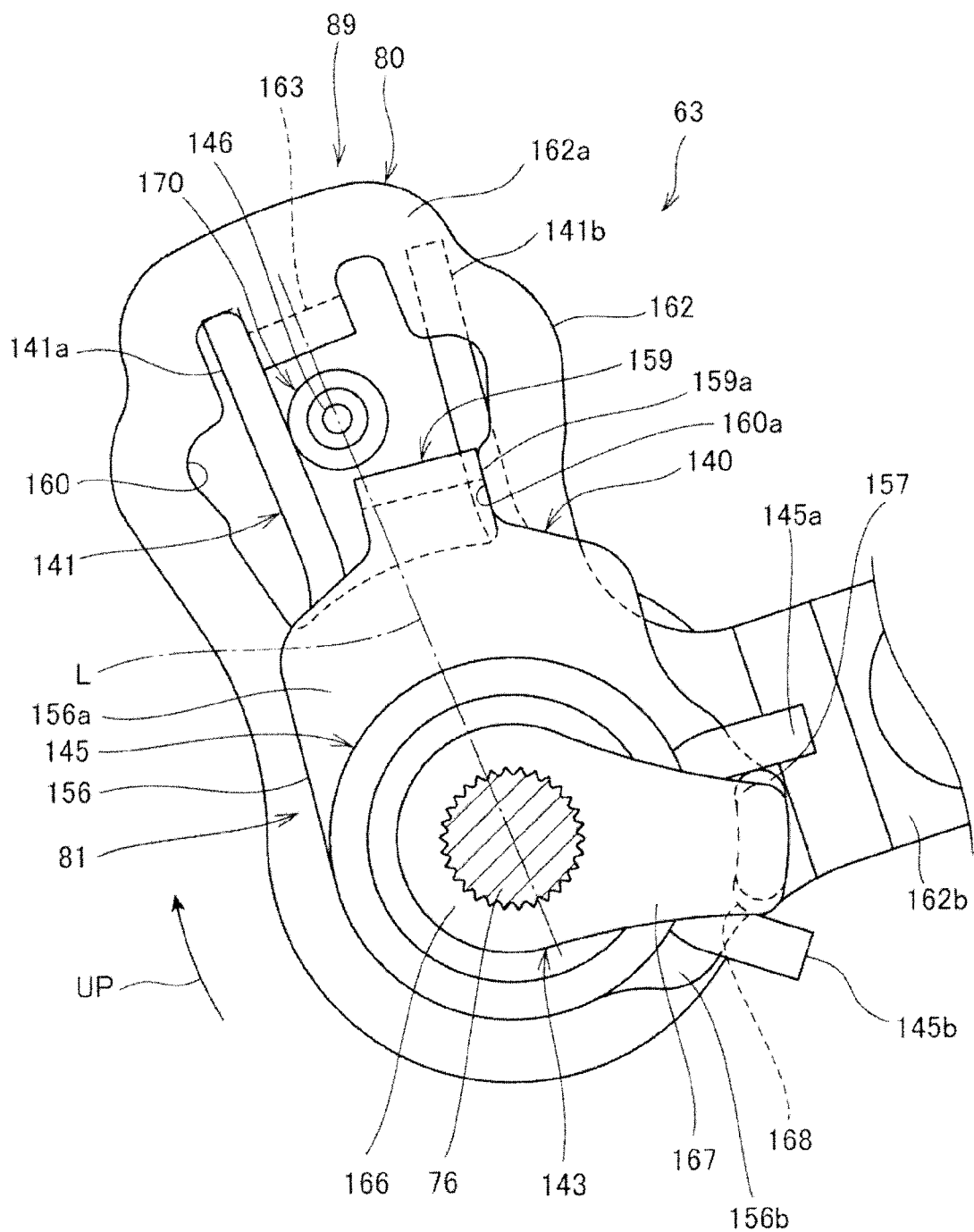
FIG. 16 illustrates a state advanced in a shift-up direction from the neutral state.

FIG. 16 illustrates a state advanced in a shift-up direction from the neutral state.

The state illustrated in FIG. 16 is a state in which rotation of the shift spindle 76 has advanced to such an extent that the contact portion 159a of the second locking piece 159 of the gear shift arm 140 makes contact with an inner edge 160a of the restriction opening 160 in the master arm 80 so that the gear shift arm 140 cannot be rotated any more. In the following description, this state will be referred to as force accumulation preparatory state.

In the force accumulation preparatory state, the gear shift arm 140 has only rotated as one body with the force accumulation collar 143 through the force accumulation spring 145 attendantly on rotation of the force accumulation collar 143. Therefore, although the force accumulation mechanism 81 has rotated as a whole in a shift-up direction, bending amount of the force accumulation spring 145 has not been changed at all, and force accumulation has not been started yet. Besides, in the force accumulation preparatory state, the rotational amount of the master arm 80 from the neutral state is zero.

In the force accumulation preparatory state, the gear shift arm 140 has been rotated against a biasing force of the return spring 141, and the other end 141b of the return spring 141 is opened by a predetermined amount.

In addition, in the force accumulation preparatory state, the sub return spring locking collar 148 has been rotated against a biasing force of the sub return spring 150, and the other end 150b of the sub return spring 150 is opened by a predetermined amount, as indicated by alternate long and two short dashes line in FIG. 13.

In the force accumulation preparatory state, the shift-down collar 142 is rotated as one body with the gear shift arm 140. As shown in FIG. 15(b), therefore, the dog tooth 164 is in contact with one end of the hole 158 in the gear shift arm 140, with a gap formed between the dog tooth 164 and the other end of the hole 158.

Figure 17:
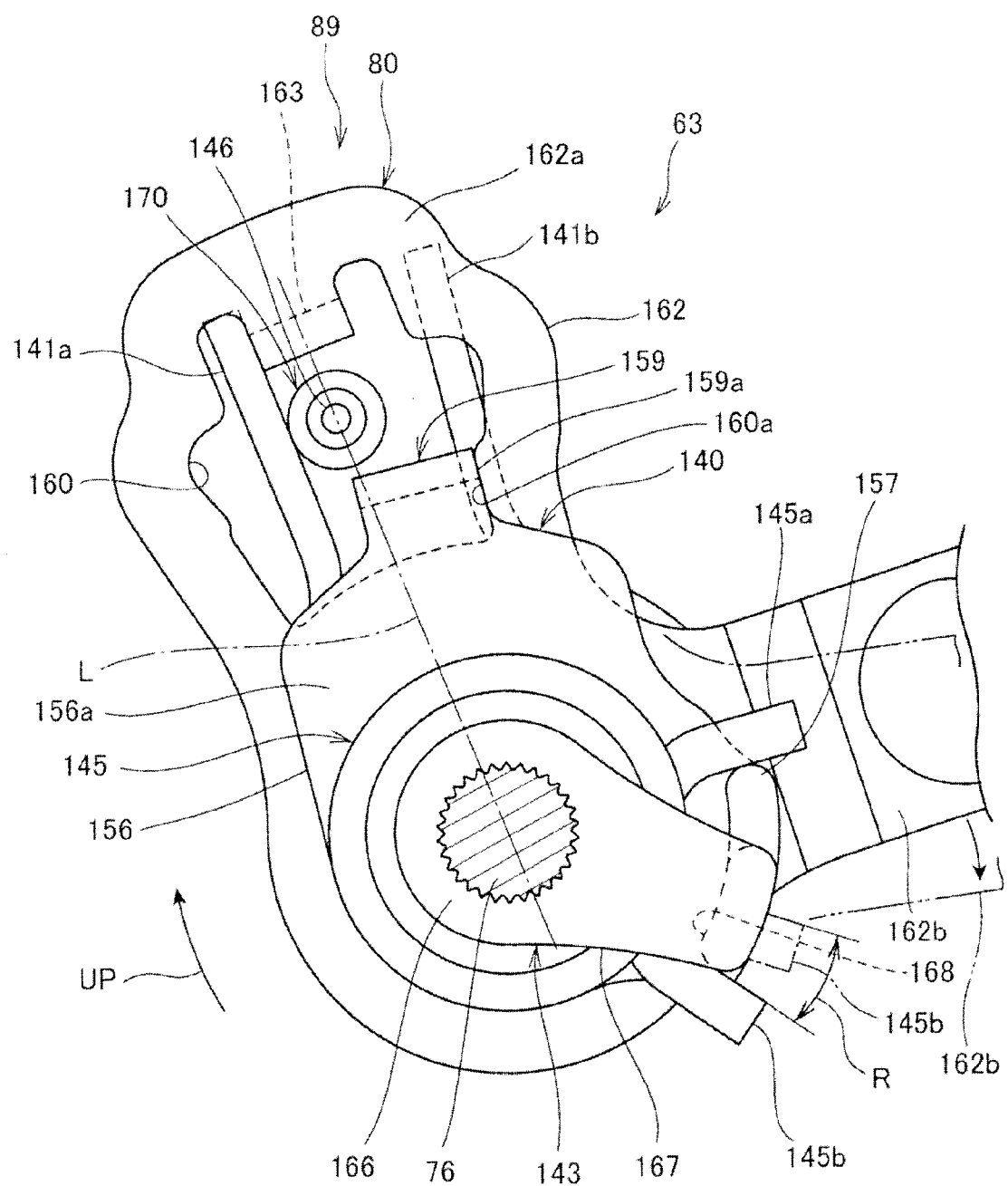
FIG. 17 illustrates a state advanced in the shift-up direction from a force accumulation preparatory state.

FIG. 17 illustrates a state advanced in the shift-up direction from the force accumulation preparatory state.

In the state depicted in FIG. 17, attendant on rotation of the shift spindle 76, only the force accumulation arm side end portion 145b of the force accumulation spring 145 has been rotated by a predetermined amount R by the force accumulation arm 168, with the gear shift arm side end portion 145a of the force accumulation spring 145 left positionally fixed by the first locking piece 157. In the following description, the state of FIG. 17 will be referred to as force accumulated state.

In the force accumulated state, the bending amount of the force accumulation spring 145 has been increased by an amount corresponding to the predetermined amount R, so that a predetermined amount of force accumulation in the force accumulation spring 145 has been completed. In addition, in the force accumulated state, the rotational amount of the master arm 80 from the neutral state is zero.

Figure 15C:
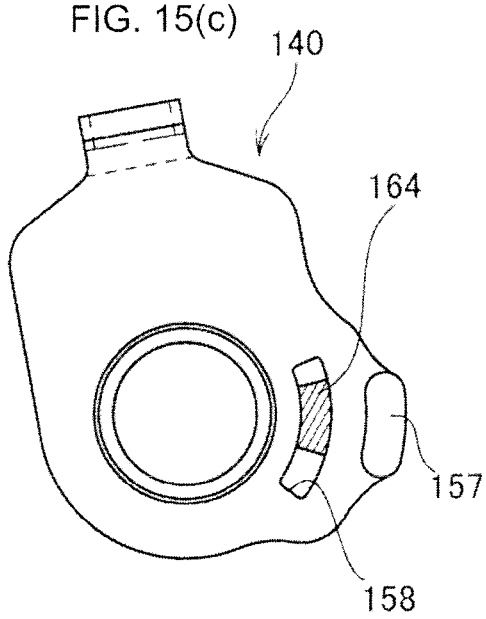

In the force accumulated state, in contrast to the gear shift arm 140 which would not be rotated because of restraint by the restriction opening 160, the shift-down collar 142 has been rotated together with the shift spindle 76. In the force accumulated state, therefore, as shown in FIG. 15(c), the dog tooth 164 is located at an intermediate position between the one end and the other end of the hole 158 in the gear shift arm 140.

Besides, in the force accumulated state, the sub return spring locking collar 148 has been rotated against the biasing force of the sub return spring 150. In this state, the other end 150b of the sub return spring 150 is opened by a further predetermined amount from the state in the force accumulation preparatory state, as indicated by alternate long and two short dashes line in FIG. 13.

Referring to FIG. 3, the clutch lever 82 is rotated as one body with the shift spindle 76. Attendant on the rotation of the clutch lever 82, the lifter cam plate 85 is moved in the axial direction, whereby the change clutch 61 is disengaged. With the change clutch disengaged, restraint on the master arm 80 by the transmission 60 is canceled, so that the master arm 80 becomes rotatable. The moment the change clutch 61 is disengaged, the force accumulated in the force accumulation mechanism 81 is released, so that the master arm 80 is rotated to a position indicated by alternate long and two short dashes line in FIG. 17 at a stroke by the accumulated force through the gear shift arm 140. Therefore, a shift can be performed speedily. The master arm 80 is rotated until that portion of the restriction opening 160 which is on the one end 141a side comes into contact with the damper portion 170 of the stopper pin 146.

Figure 15D:
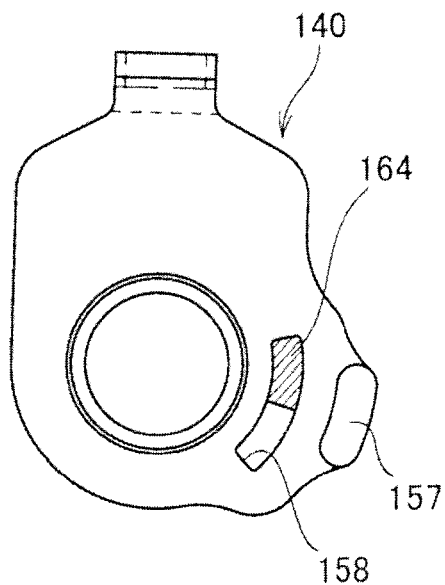

When the accumulated force is released, the gear shift arm 140 is rotated in a shift-up direction relative to the shift-down collar 142 staying at rest, resulting in that one end of the hole 158 in the gear shift arm 140 makes contact with the dog tooth 164 as shown in FIG. 15(d). Therefore, when rotating the shift spindle 76 in the shift-down direction opposite to the shift-up direction, the gear shift arm 140 can be rapidly rotated in the shift-down direction through the dog tooth 164. Consequently, returning into the neutral state can be achieved speedily.

At the time of shifting-down, first, the gear shift arm 140 is progressively rotated in the shift-down direction from the neutral state shown in FIG. 11, and a contact portion 159c of the gear shift arm 140 comes into contact with an inner edge 160b of the restriction opening 160 of the master arm 80. The section from the neutral state to the contact of the contact portion 159c with the inner edge 160b corresponds to section Y in FIG. 8. In the section Y, the change clutch 61 is disengaged attendantly on the rotation of the shift spindle 76, but the shift drum 70 is not yet rotated. When the shift spindle 76 is rotated in the shift-down direction beyond the section Y, the master arm 80 is rotated in the shift-down direction through the contact portion 159c, and the shift drum 70 is rotated, to carry out a shift-down.

Figure 18:
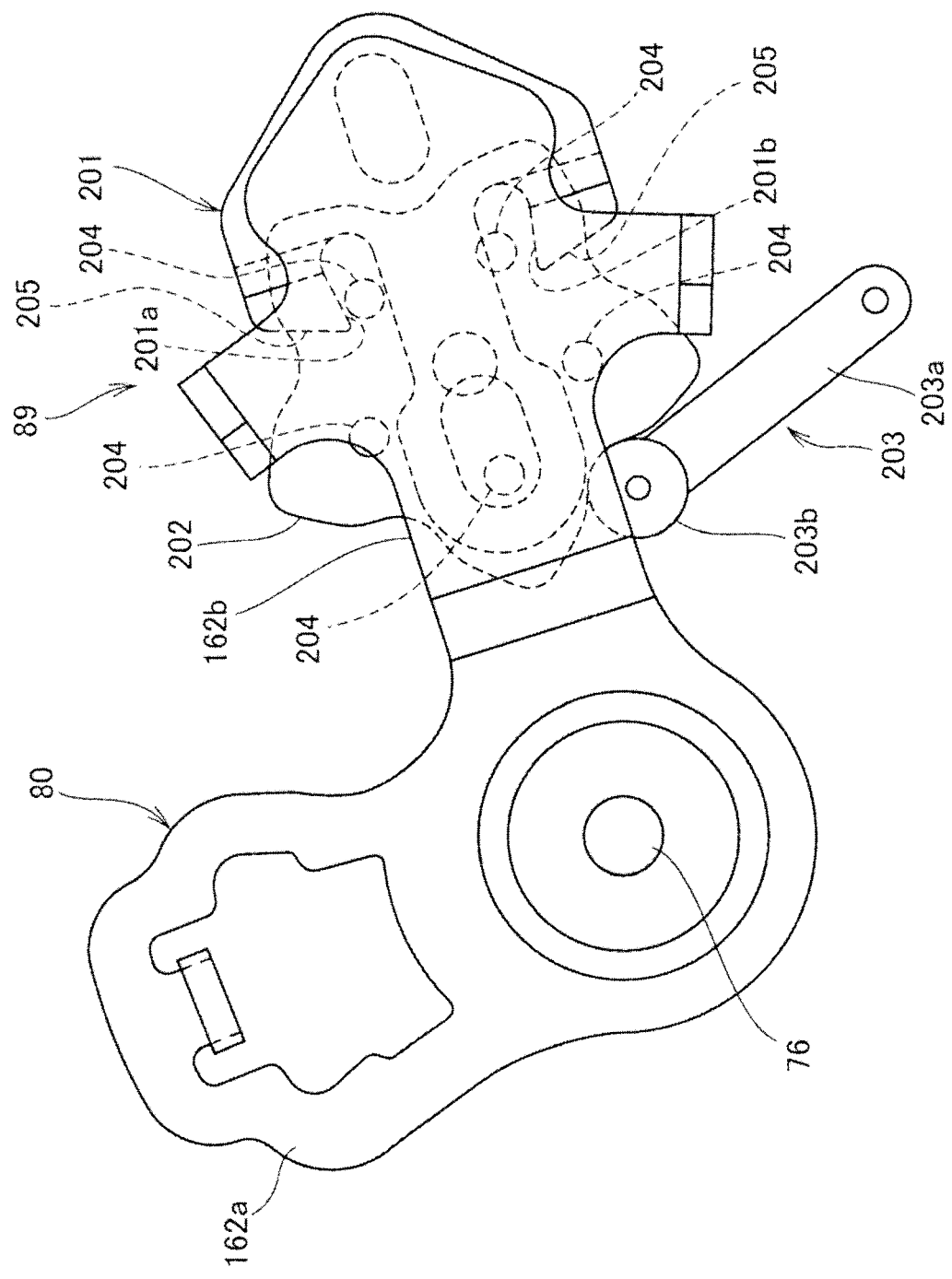
FIG. 18 is a side view of a change mechanism.
Figure 19:
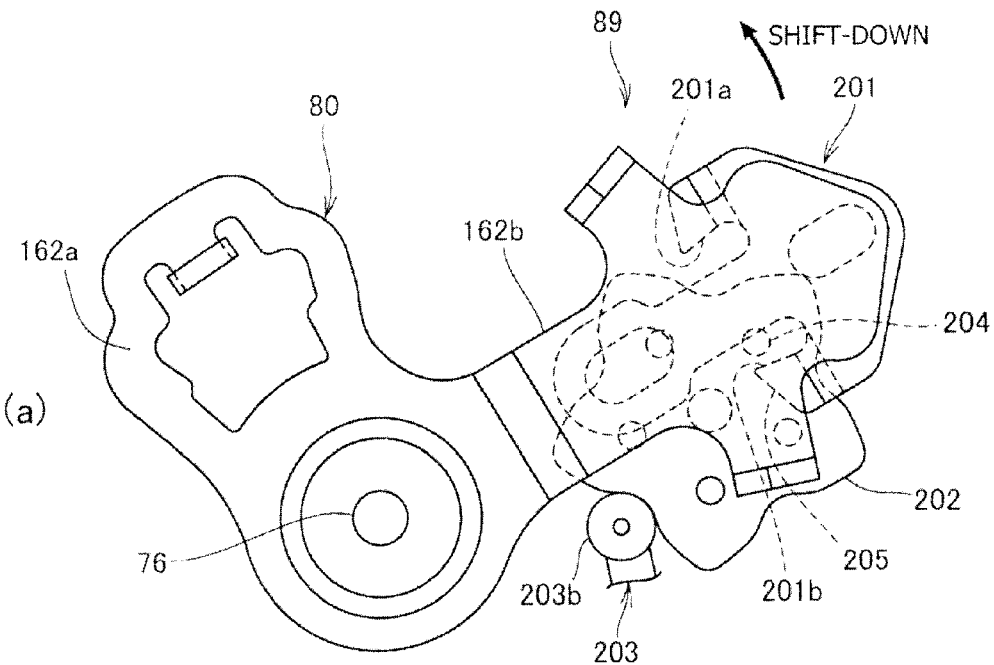
FIGS. 19(a) and 19(b) illustrate operating states of the change mechanism, wherein 19(a) shows a state upon completion of normal feeding in a shift-down direction, and 19(b) shows a state of returning toward a neutral position side from the state of 19(a).
Figure 19B:
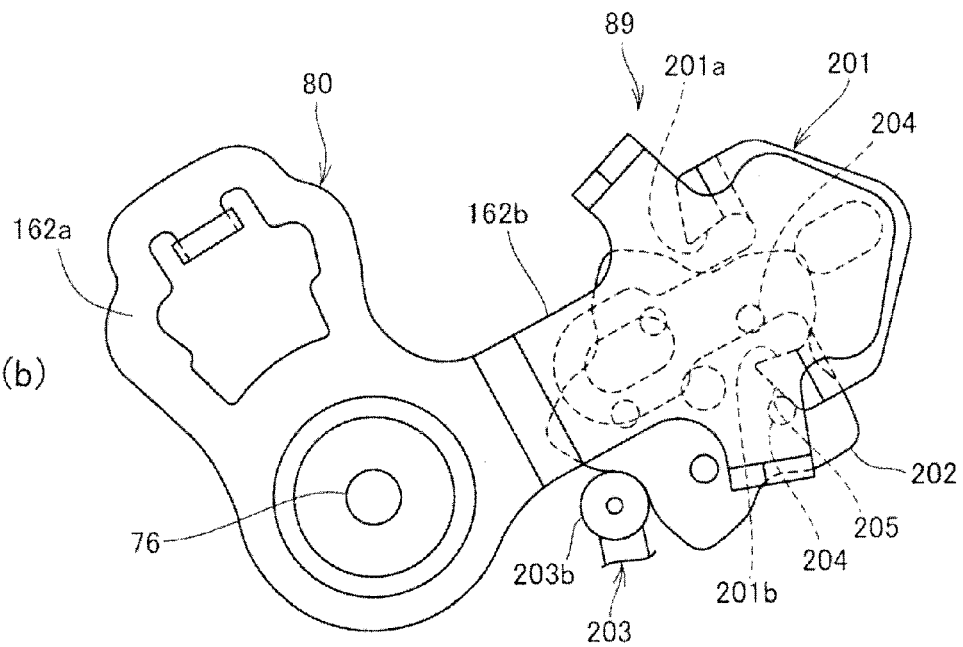

FIG. 18 is a side view of the change mechanism 89. FIGS. 19(a) and 19(b) illustrate operating states of the change mechanism 89, wherein 19(a) shows a state upon completion of normal feeding in a shift-down direction, and 19(b) shows a state of returning toward a neutral position side from the state of 19(a).

The change mechanism 89 includes a feeding operation member 201 provided at a tip portion of the master arm 80, and a star-shaped plate 202 provided at a shaft end of the shift drum 70 (FIG. 14). A stopper arm 203 (biasing member) makes contact with an outer circumferential portion of the star-shaped plate 202 to restrict rotational position of the star-shaped plate 202.

The star-shaped plate 202 includes a plurality (five) of cam ridges projecting radially at positions at substantially regular intervals along the circumferential direction, and a plurality (five) of locking pins 204 projecting in the axial direction from outside surfaces of the cam ridges, respectively. The star-shaped plate 202 is provided to be integral with the shift drum 70. The shift drum 70 is rotated by a process in which the locking pin 204 is pressed by the feeding operation member 201.

The stopper arm 203 includes an arm portion 203a rotatably supported on the crankcase 26, and a roller 203b rotatably supported on a tip portion of the arm portion 203a. The arm portion 203a is biased by a spring (not shown), which is connected to the arm portion 203a, so that the roller 203b constantly stays in contact with an outer circumferential portion of the star-shaped plate 202. In other words, when the shift drum 70 rotates, the roller 203b moves along the cam ridges and cam valleys between the cam ridges of the star-shaped plate 202.

The feeding operation member 201 is slidable in a longitudinal direction of the operation arm 162b of the master arm 80, and is biased by a spring or the like (not shown) so as to move toward the shift spindle 76 side.

The feeding operation member 201 is provided on the tip side thereof with a shift-up pressing portion 201a and a shift-down pressing portion 201b which project in the axial direction of the shift drum 70 toward the locking pin 204 side.

FIG. 18 illustrates a neutral state of the change mechanism 89. In this state, the roller 203b is in engagement with a valley portion of the star-shaped plate 202, whereby the shift drum 70 is positioned at a rotational angle corresponding to a predetermined gear position. Besides, in the neutral state, the shift-up pressing portion 201a and the shift-down pressing portion 201b are located at respective positions slightly spaced to the outer sides from the two adjacent locking pins 204, 204.

When the master arm 80 is rotated in a shift-down direction in response to a shift-down command, the shift-down pressing portion 201b comes into contact with one locking pin 204 from below, and rotates the shift drum 70 in a shift-down direction through the locking pin 204. In this case, the shift-down pressing portion 201b rotates the shift drum 70 against a biasing force of the stopper arm 203. Specifically, the shift-down pressing portion 201b rotates the shift drum 70 against the biasing force of the stopper arm 203, until the roller 203b comes beyond the cam ridge of the star-shaped plate 202. After the roller 203b has come beyond the cam ridge of the star-shaped plate 202, a pressing force at the time of the roller 203b coming down toward the valley portion side causes the shift drum 70 to automatically rotate until the roller 203b comes into engagement with the valley portion. In other words, if the shift drum 70 is rotated to such a position that the roller 203b comes beyond the cam ridge of the star-shaped plate 202, the shift drum 70 automatically rotates to a position corresponding to the next shift position even after the shift-down pressing portion 201b is separated from the locking pin 204. Therefore, in a state in which the master arm 80 has been completely fed in the shift-down direction, as shown in FIG. 19(a), the shift-down pressing portion 201b is separate from the locking pin 204. In other words, if the shift drum 70 is rotated to such a position that the roller 203b comes beyond the cam ridge of the star-shaped plate 202, the master arm 80 is rotatable also in the opposite direction, independently from the shift drum 70.

At the time of returning from the state of FIG. 19(a) to the neutral state of FIG. 18, the master arm 80 is rotated in a shift-up direction. In this case, the feeding operation member 201 is moved in the longitudinal direction of the operation arm 162b by a process in which its returning contact portion 205 provided in the vicinity of its shift-down pressing portion 201b rotates while making contact with the other locking pin 204, as shown in FIG. 19(b). Upon complete returning to the neutral position, the state of FIG. 18 is established.

While the case of shifting-down has been described here, a shifting-up process includes pressing of the locking pin 204 by the shift-up pressing portion 201a, which causes the shift drum 70 to be rotated in a shift-up direction.

When re-engaging the change clutch 61 after a gear change to the next gear position, the control unit performs a difference rotation absorbing control of engaging the change clutch 61 in a partial clutch engagement state to thereby absorb the difference rotation of the change clutch 61. The difference rotation absorbing control will now be described below.

Figure 20:
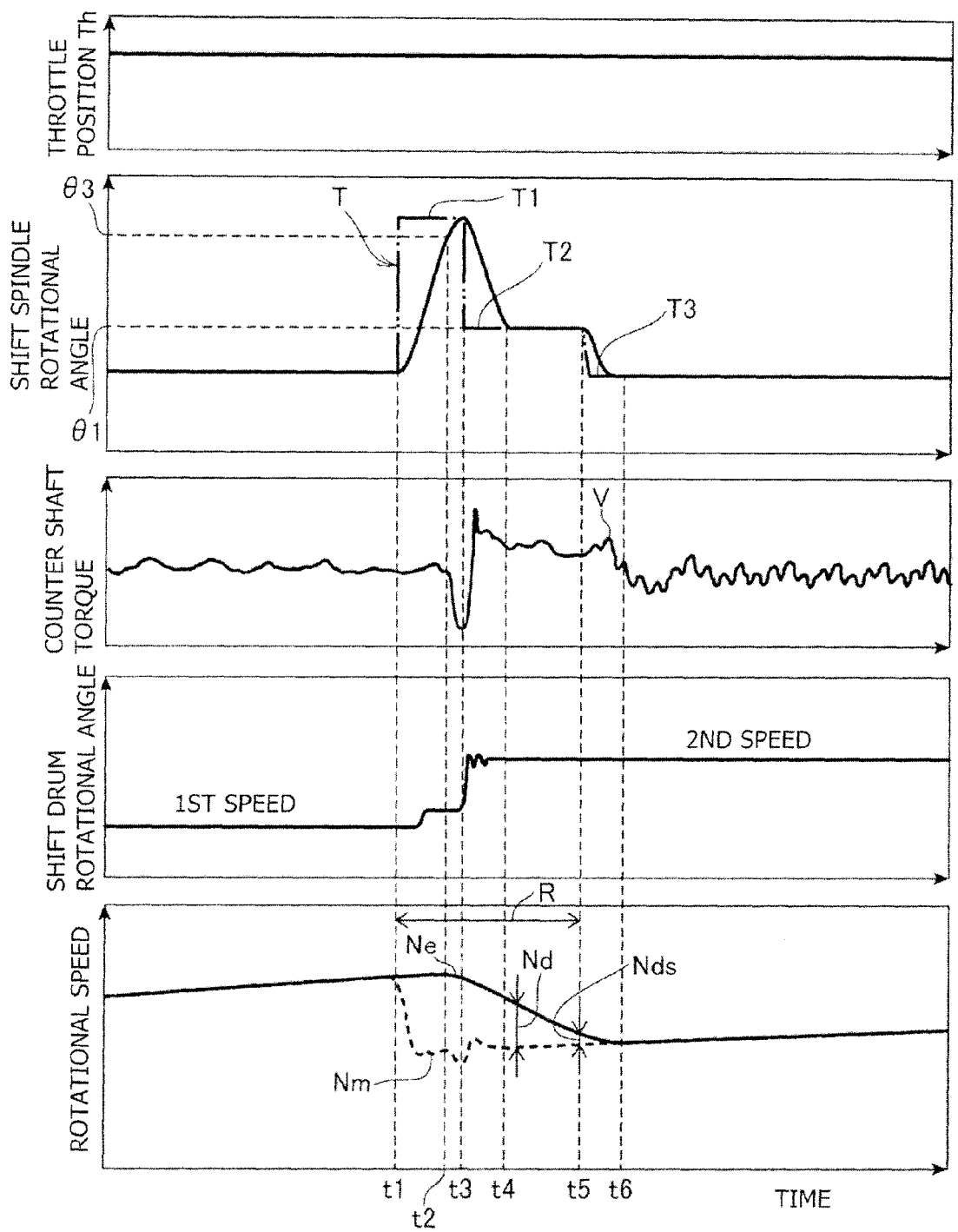
FIG. 20 shows time charts of an operation of the automatic speed change apparatus at the time of shifting-up.

FIG. 20 shows time charts for an operation of the automatic speed change apparatus 25 at the time of shifting-up.

In FIG. 20, time is taken on the axis of abscissas, whereas throttle position Th of the throttle valve 53, rotational angle of the shift spindle 76, torque of the counter shaft 66, rotational angle of the shift drum 70, rotational speed Ne of the engine 21, and rotational speed Nm of the main shaft 65 are taken on the axis of ordinates.

Here, the rotational speed Nm of the main shaft is a value obtained by multiplying an actual rotational speed of the main shaft 65 detected by the main shaft rotational speed sensor 65a by a reduction gear ratio between the main shaft 65 and the crankshaft 23. For this reason, in the state in which the change clutch 61 is completely engaged, the rotational speed Ne and the rotational speed Nm are equal. When a slip is occurring in the change clutch 61 due to the partial clutch engagement state or the like, on the other hand, a difference is generated between the rotational speed Ne and the rotational speed Nm. In other words, the engagement state of the change clutch 61 is seen from the diagram of the rotational speed in FIG. 20. The difference between the rotational speed Ne of the engine and the rotational speed Nm of the main shaft 65 during clutch engagement on a partial clutch engagement basis is difference rotation Nd.

In FIG. 20, the position (angle or opening) of the throttle valve 53 is 75%, a comparatively large value.

In FIG. 20, as rotational angle of the shift drum 70, a state of shifting from a first speed to a second speed is shown as an example, but a similar state is observed in the cases of other speeds (gear positions).

In a time chart of the rotational angle of the shift spindle 76 in FIG. 20, a target angle pattern T for the rotational angle of the shift spindle 76 which is set by the control unit 17 is also shown. The control unit drives the shift motor 75 so that the angle of the shift spindle 76 will follow up to the target angle pattern T. At the time of shifting-up, the rotational angle of the shift spindle 76 is increased for operating the gear change mechanism 63 and the clutch operation mechanism 62, and, after the shifting, the shift spindle (or the rotational angle thereof) is returned to a neutral position.

The target angle pattern T includes a disengaging-side target angle T1 for rotating the shift spindle 76 until the change clutch 61 is disengaged. A difference rotation absorbing target angle T2 is used for rotating the shift spindle 76 so as to attain a partial clutch engagement state after the shifting. A returning-side target angle T3 is used for returning the shift spindle 76 into the neutral position. In FIG. 20, the difference rotation absorbing target angle T2 is the rotational angle θ1 at which the first intermediate capacity C2 is obtained.

In FIG. 20, rotation of the shift spindle 76 to the disengaging-side target angle T1 is started at time t1. The rotational angle θ3 is reached and the change clutch 61 is completely disengaged at time t2. The shift spindle 76 reaches the disengaging-side target angle T1 and rotation to the difference rotation absorbing target angle T2 is started at time t3. The shift spindle 76 is kept at the rotational angle θ1 (difference rotation absorbing target angle T2) during a section between time t4 and time t5. Rotation to the returning-side target angle T3 is started at time t5, and the shift spindle 76 is returned to the neutral position at time t6.

The force accumulation mechanism 81 starts force accumulation during the section between time t1 and time t2. When the change clutch 61 is disengaged at time t2, the force accumulation mechanism 81 releases the accumulated force, to start rotating the shift drum 70 through the master arm 80. By this operation, a gear change to the next gear position (second speed) is performed in the row of gears in the transmission 60, and the gear change (shift) in the transmission 60 is completed before time t4.

When the rotational angle of the shift spindle increases and the change clutch 61 is disengaged at the rotational angle θ3 at time t2, the torque of the counter shaft 66 lowers because the supply of power from the engine 21 stops. Thereafter, the torque of the counter shaft 66 again increases when engagement of the change clutch 61 is started.

In the case of shifting-up, the next gear position (speed) is higher than the gear position (speed) before the shift. Therefore, in the case where the vehicle speed of the motorcycle 10 does not change considerably at around the shift, the rotational speed (not shown) of the counter shaft 66 connected to the rear wheel 13 lowers after the shift. In this case, the rotational speed Nm of the main shaft 65 connected to the counter shaft 66 also lowers in the manner of conforming to the rotational speed of the counter shaft 66. Besides, after the shift, the rotational speed Ne of the engine 21 gradually lowers in the manner of conforming to the rotational speed Nm of the main shaft 65.

After time t1 at which the difference rotation absorbing control is started, the control unit 17 performs a retard control of retarding the ignition timing of the spark plug 57 from a normal timing, thereby lowering the output of the engine 21 during the difference rotation absorbing control. In the normal running state before time t1, the control unit 17 causes ignition at the spark plug 57 to occur at the normal timing.

In addition, after time t1 at which the difference rotation absorbing control is started, the control unit 17 performs a fuel cut-down control of reducing the fuel injection amount at the fuel injection valve 54 to below a normal amount, thereby lowering the output of the engine 21 during the difference rotation absorbing control.

The section during which the retard control and the fuel cut-down control are conducted is the section R between time t1 and time t5. On the other hand, the time to start the retard control and the fuel cut-down control can be an arbitrary time after time t1.

When the change clutch 61 starts to be engaged after time t3, the difference rotation Nd starts to be absorbed in a partial clutch engagement state. As time elapses, the rotational speed Ne approaches the rotational speed Nm, with the difference rotation Nd decreasing.

Absorption of the difference rotation by the first intermediate capacity C2 starts from time t4. Then, when the difference rotation Nd is lowered to the standard difference rotational speed Nds at time t5, the control unit 17 winds up the difference rotation absorption by the partial clutch engagement state, and returns the shift spindle 76 into the neutral position. Besides, when the difference rotation Nd is lowered to the standard difference rotational speed Nds, the control unit 17 finishes the retard control and the fuel cut-down control, to return the system to the normal ignition timing and the normal fuel injection amount.

Thus, the retard control and the fuel cut-down control are performed during the section during which the difference rotation absorption by the first intermediate capacity C2 is conducted, and, when the difference rotation absorption by the first intermediate capacity C2 is finished, the system is returned to the normal ignition timing and the normal fuel injection amount.

FIG. 21 is a diagram showing an example of a map for selection of the standard difference rotational speed Nds.

In FIG. 21, there are shown relationships between rotational speed Ne (rpm) of the engine 21, throttle position Th (%) of the throttle valve 53, capacity of the change clutch 61, and the standard difference rotational speed Nds (rpm). In FIG. 21, the parts corresponding to the first intermediate capacity C2 are represented by dot hatching, the parts corresponding to the second intermediate capacity C3 are represented by slant-line hatching, and the parts corresponding to the disengagement capacity C4 are represented by white ground.

The control unit 17 stores the map of FIG. 21, and acquires the standard difference rotational speed Nds on the basis of the map.

In the map of FIG. 21, the standard difference rotational speed Nds is set mainly correspondingly to the output (torque) of the engine 21. Under the condition where the torque of the engine 21 becomes higher, the capacity of the change clutch 61 is set higher, and the standard difference rotational speed Nds is set lower.

Specifically, in a region where the throttle position (opening or angle) Th is small, the capacity of the change clutch 61 is set at the second intermediate capacity C3. In a region where the throttle position Th is large, the capacity of the change clutch 61 is set at the first intermediate capacity C2, which is a high capacity. For example, in the case where the rotational speed Ne of the engine 21 is 3,000 rpm, the second intermediate capacity C3 is set if the throttle position Th is 20%, whereas the first intermediate capacity C2 is set if the throttle position Th is not less than 30%.

In addition, in a region where the rotational speed Ne of the engine 21 is low, the capacity of the change clutch 61 is set at the first intermediate capacity C2. In a region where the rotational speed Ne is high, the capacity of the change clutch 61 is set at the second intermediate capacity C3, which is a low capacity. The reason lies in that the engine 21, like other general engines, has such torque characteristics that the torque lowers when the rotational speed Ne enters a high rotation region.

For instance, in the case where the throttle position Th is 40%, the first intermediate capacity C2 is set for a rotational speed Ne of up to 6,500 rpm, and the second intermediate capacity C3 is set, according to a lowering in torque, for a rotational speed Ne of not less than 7,000 rpm.

The standard difference rotational speed Nds is set at a lower value as the throttle position Th is greater. For example, in the case where the rotational speed Ne of the engine 21 is 3,000 rpm and the first intermediate capacity C2 is set, the standard difference rotational speed Nds is set at 500 rpm for a throttle position Th of 30%, and is set at 450 rpm for a throttle position Th of not less than 50%.

Besides, the standard difference rotational speed Nds is set at a higher value as the rotational speed Ne of the engine 21 is higher. For instance, in the case where the throttle position Th is 75%, the standard difference rotational speed Nds is set at 450 rpm for a rotational speed Ne of up to 6,000 rpm, and is set at 500 rpm, correspondingly to a lowering in torque of the engine 21, for a rotational speed Ne of not less than 6,500 rpm.

Thus, it is ensured that the standard difference rotational speed Nds is variable according to the torque of the engine 21, whereby the shock at the time of engagement of the change clutch 61 can be reduced.

In the region represented by the while ground in the map of FIG. 21, the torque of the engine 21 is low. Therefore, the absorption of the difference rotation is conducted in the disengagement capacity C4 where the change clutch 61 is in a disengaged state. When the difference rotation Nd is reduced, with the lapse of time, to zero, the change clutch 61 is engaged. For this reason, in the region represented by the white ground in the map of FIG. 21, no standard difference rotational speed Nds is set.

Figure 22:
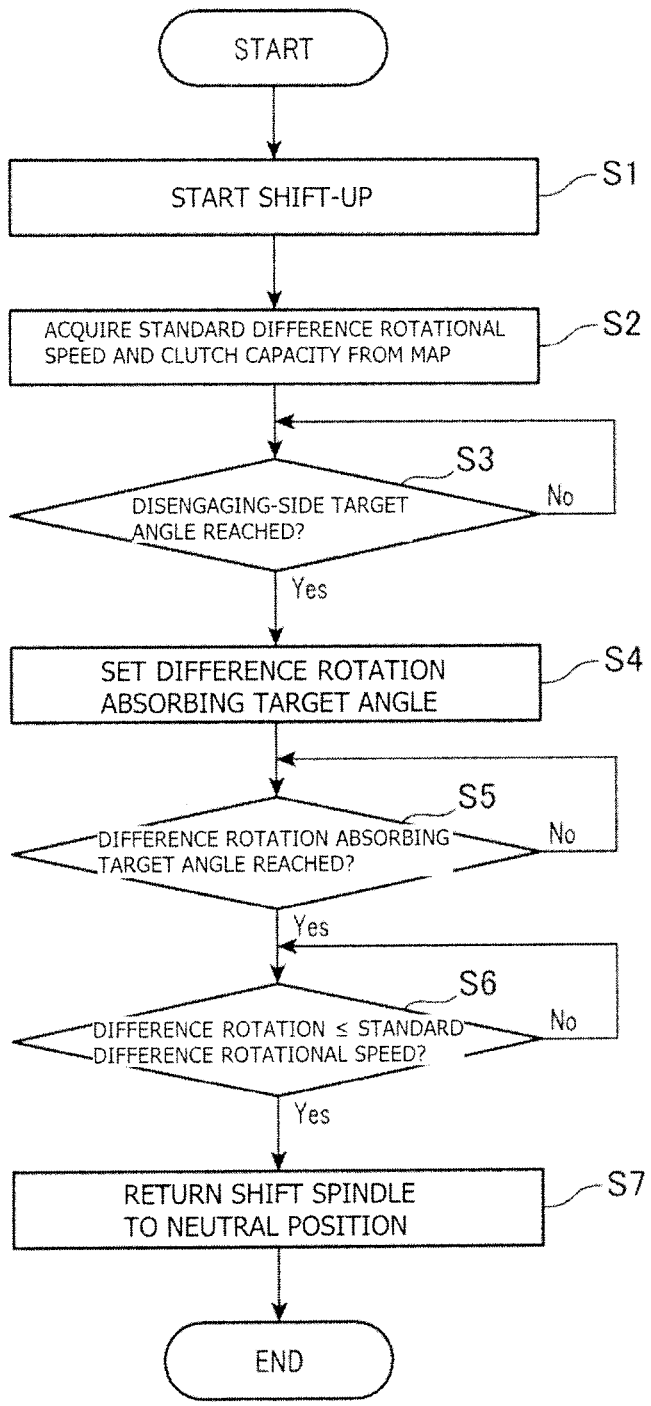
FIG. 22 is a flow chart showing the process of a difference rotation absorbing control.

FIG. 22 is a flow chart for the process of the difference rotation absorbing control.

When a condition such as a condition where the motorcycle 10 has reached a predetermined speed is satisfied during running of the motorcycle 10, the control unit 17 starts a shift-up (step S1). Specifically, the control unit 17 sets a disengaging-side target angle T1, and drives the shift motor 75 so as to reach the disengaging-side target angle T1. Here, the disengaging-side target angle T1 is set at an angle greater than the rotational angle θ3 at which the change clutch 61 is completely disengaged. Therefore, the change clutch 61 is disengaged before the shift spindle 76 reaches the disengaging-side target angle T1.

Next, the control unit 17 puts the rotational speed Ne of the engine 21 and the throttle position (angle) Th at that time point into the map of FIG. 21, to acquire the corresponding standard difference rotational speed Nds and capacity of the change clutch 61 (step S2). Here, in the state of FIG. 20, the rotational speed Ne of the engine 21 is 6,000 rpm and the position of the throttle valve 53 is 75%. Therefore, a standard difference rotational speed Nds of 450 rpm is acquired, and the first intermediate capacity C2 is acquired as the capacity of the change clutch 61.

Further, in step S2, a retard control and a fuel cut-down control are started under conditions corresponding to the rotational speed Ne, the position of the throttle valve 53, the standard difference rotational speed Nds, and the clutch capacity and the like acquired as above. In other words, in the present embodiment, the acquirement of the standard difference rotational speed Nds and the capacity of the change clutch 61 and the start of the retard control and the fuel cut-down control are performed between time t1 and time t2. By the retard control and the fuel cut-down control, the torque of the engine 21 is reduced.

Next, the control unit 17 determines whether or not the shift spindle 76 has reached the disengaging-side target angle T1 (step S3). If the disengaging-side target angle T1 has not yet been reached (step S3: No), rotation of the shift spindle 76 is continued. If the disengaging-side target angle T1 has been reached (step S3: Yes), the control unit 17 sets the first intermediate capacity C2 (namely, the clutch capacity acquired in step S2) as the difference rotation absorbing target angle T2 (step S4), and rotates the shift spindle 76.

Subsequently, the control unit 17 determines whether or not the shift spindle 76 has reached the difference rotation absorbing target angle T2 (step S5). If the difference rotation absorbing target angle T2 has not yet been reached (step S5: No), the control unit 17 continues rotation of the shift spindle 76.

If the difference rotation absorbing target angle T2 has been reached (step S5: Yes), the control unit 17 determines whether or not the difference rotation Nd at that time is at or below the standard difference rotational speed Nds (step S6).

When the shift spindle 76 reaches the difference rotation absorbing target angle T2, absorption of the difference rotation Nd in the condition where the clutch capacity is kept constant at the first intermediate capacity C2 is started, and the difference rotation Nd decreases with the lapse of time.

If the difference rotation Nd is not at or below the standard difference rotational speed Nds (step S6: No), the control unit 17 waits for the difference rotation Nd to be lowered to or below the standard difference rotational speed Nds.

If the difference rotation Nd is at or below the standard difference rotational speed Nds (step S6: Yes), the control unit 17 finishes the retard control and the fuel cut-down control to return the system to the normal ignition timing and the normal fuel injection amount. In addition, the control unit 17 sets a returning-side target angle T3, rotates the shift spindle toward the neutral position, and then finishes the process when the shift spindle 76 reaches the neutral position (step S7). In other words, in step S7, when the difference rotation Nd is lowered to or below the standard difference rotational speed Nds at time t5, the difference rotation absorption by the first intermediate capacity C2, the retard control and the fuel cut-down control are wound up, and the shift spindle 76 is returned to the neutral position.

Thus, when the difference rotation Nd is lowered to or below the standard difference rotational speed Nds, the retard control and the fuel cut-down control are finished and the system is returned to the normal ignition timing and the normal fuel injection amount. In addition, the shift spindle 76 is returned into the neutral position, and the clutch capacity is set to the maximum capacity C1. By these operations, the deficiency in power of the engine 21 immediately after engagement of the change clutch 61 after a shift can be restrained, and blow-up of the engine 21 due to deficient clutch capacity can be restrained. Furthermore, the standard difference rotational speed Nds is variable according to the position (angle or opening) of the throttle valve 53. As the opening of the throttle valve is greater, or as the load of the engine 21 is greater, the standard difference rotational speed Nds is set lower. By such a setting, the change clutch 61 is engaged at a proper timing, so that acceleration vibration generated upon engagement of the change clutch 61 can be reduced.

As shown in FIG. 20, the acceleration vibration V appears as a build-up (rise) in torque of the counter shaft 66 immediately before time t6 at which the change clutch 61 is completely engaged, and its magnitude is suppressed to a minimum. Note that the part where the acceleration vibration is generated coincides with the part where a rapid increase and a rapid decrease in the torque of the counter shaft 66 are generated (exclusive of the part where the change clutch 61 is disengaged).

Figure 23:
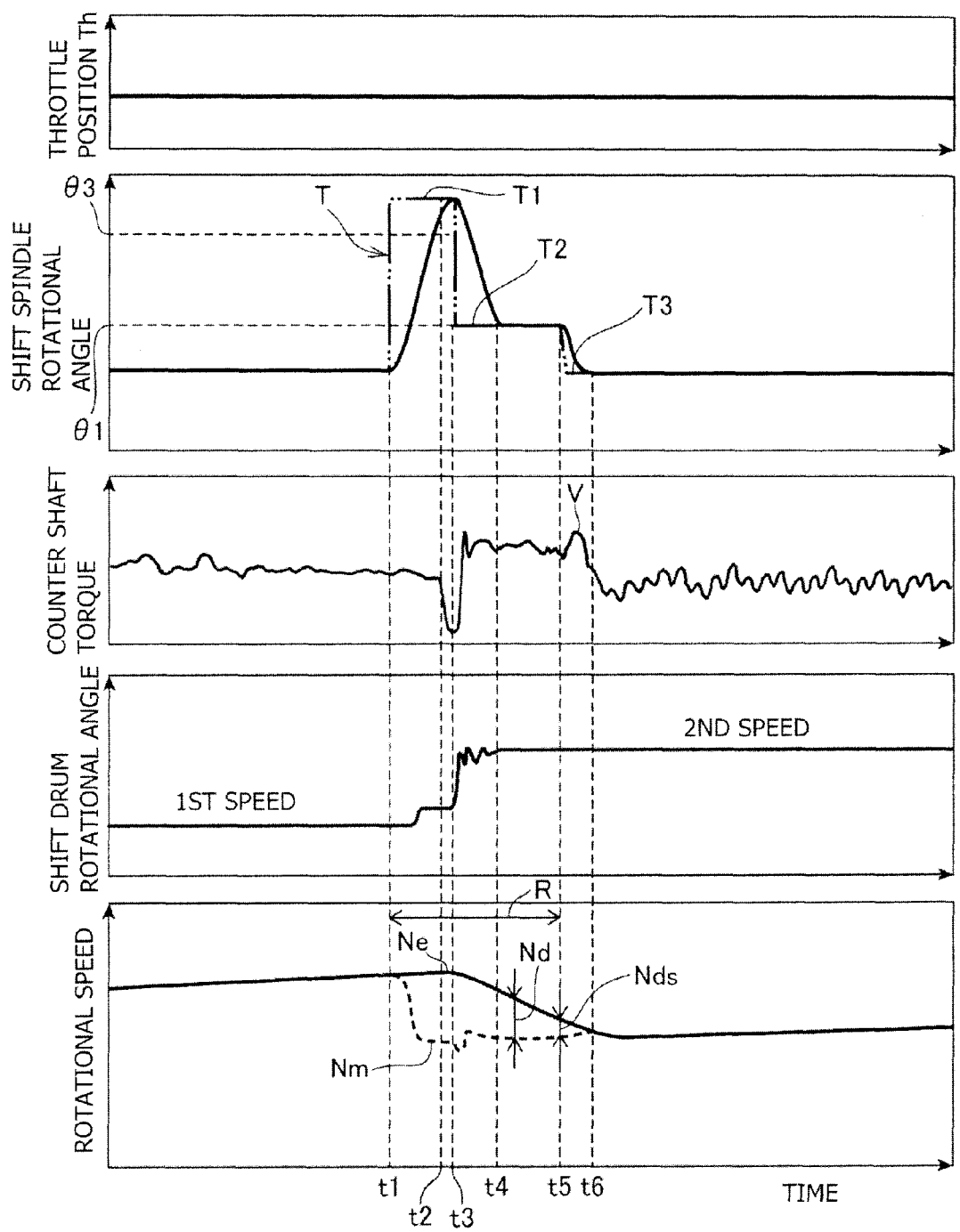
FIG. 23 shows time charts of a difference rotation absorbing control in the case where the opening (angle or position) of a throttle valve is smaller than in FIG. 20.

FIG. 23 shows time charts for a difference rotation absorbing control in the case where the position (angle or opening) of the throttle valve 53 is smaller than that in FIG. 20. In FIG. 23, the conditions other than the position of the throttle valve 53 are the same as those in FIG. 20.

Where the position of the throttle valve 53 is as comparatively small as 40% and the rotational speed Ne of the engine 21 is 6,000 rpm, as shown in FIG. 21, a standard difference rotational speed Nds of 500 rpm is acquired, and the first intermediate capacity C2 is acquired as the capacity of the change clutch 61.

In the condition of FIG. 23, the capacity of the change clutch 61 acquired is the same as that in the condition of FIG. 20, but, since the position of the throttle valve 53 is comparatively small and the load of the engine 21 is comparatively small, the standard difference rotational speed Nds acquired is 500 rpm, which is greater than that in the condition of FIG. 20 by 50 rpm.

In FIG. 23, also, the acceleration vibration V of the counter shaft 66 is suppressed to be comparatively small.

In addition, referring to FIG. 21, for example where the position of the throttle valve 53 is 75% and the rotational speed Ne of the engine 21 is 6,500 rpm, a standard difference rotational speed Nds of 500 rpm is acquired, and the first intermediate capacity C2 is acquired as the capacity of the change clutch 61.

In other words, at the position of the throttle valve 53 of 75%, since the torque of the engine 21 is lowered at a rotational speed Ne of between 6,000 rpm and 6,500 rpm, the standard difference rotational speed Nds is accordingly set to be higher than that in the case of 6,000 rpm.

When the standard difference rotational speed Nds is higher, the difference rotation absorption by the first intermediate capacity C2, the retard control and the fuel cut-down control are wound up earlier, so that the time for which the change clutch 61 is in a disengaged state is shorter.

Figure 24:
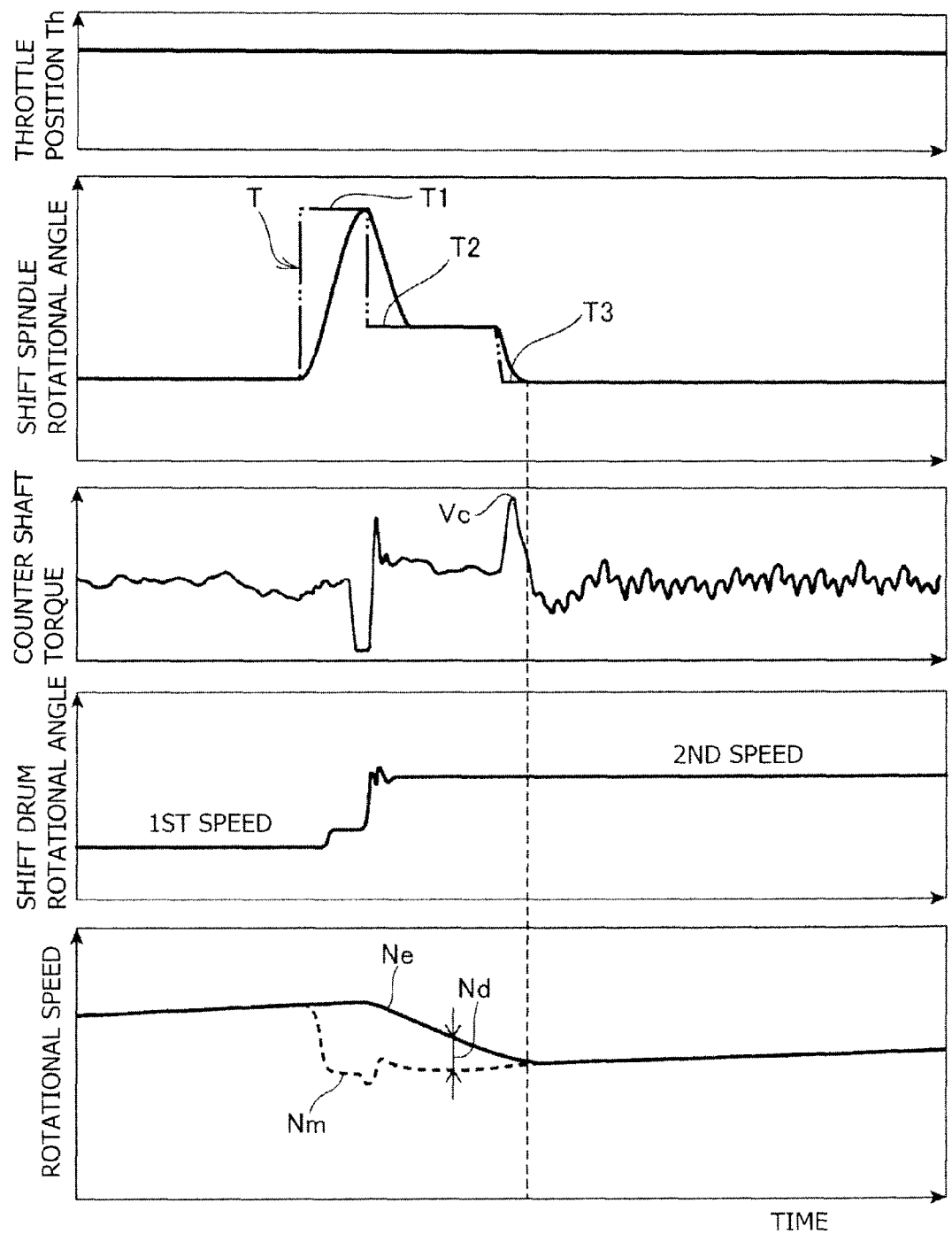
FIG. 24 shows time charts of the process of a shift in a comparative example.

FIG. 24 shows time charts showing the process of a shift in a comparative example.

In this comparative example, the standard difference rotational speed Nds varying according to the load of the engine 21 is not adopted. The control unit returns the shift spindle 76 to the neutral position and engages the change clutch 61 when the difference rotation Nd becomes 500 rpm, irrespectively of the load of the engine 21.

In the comparative example, therefore, in the case where the conditions are the same as those in FIG. 20, namely, in the case where the rotational speed Ne of the engine 21 is 6,000 rpm and the position of the throttle valve 53 is 75%, the change clutch 61 is engaged when the difference rotation Nd becomes 500 rpm. As a result, the timing of engagement of the change clutch 61 would be too early with respect to the load of the engine 21, and, accordingly, a severe acceleration vibration Vc is generated on the counter shaft 66.

As has been described above, according to one embodiment of the present invention, the automatic speed change apparatus 25 includes the main shaft 65 to which rotational power of the engine 21 is inputted through the change clutch 61 and which is provided with the plurality of driving gears inclusive of the driving gear 67b. The counter shaft 66 is provided with the plurality of driven gears driven by the driving gears, the driven gears including the driven gear 68c. The clutch operation mechanism 62 is driven by the shift motor 75 and configured to engage and disengage the change clutch 61. The gear change mechanism 63 is configured to operate the driving gear 67b or the driven gear 68c to thereby operate the gear position. The control unit 17 is configured to operate the shift motor 75. The engine rotational speed sensor 58 is for detecting rotational speed Ne of the engine 21, and the main shaft rotational speed sensor 65a is for detecting rotational speed Nm of the main shaft 65 on downstream side of the change clutch 61. The control unit 17 is configured to control the output of the engine 21 and detect difference rotation Nd of the change clutch 61 on the basis of values detected by the engine rotational speed sensor 58 and the main shaft rotational speed sensor 65a. The change clutch 61 has the first intermediate capacity C2 between the maximum capacity C1 and the disengagement capacity C4. In the automatic speed change apparatus 25, the throttle position sensor 134 for detecting the load on the engine 21 is provided. In addition, the control unit 17 is so configured that after the gear change mechanism 63 has changed the gear position at the time of a shift, the control unit 17 operates the shift motor 75 to put the change clutch 61 into the first intermediate capacity C2, thereby reducing the difference rotation Nd of the change clutch 61, and temporarily lowers the output of the engine 21 below a normal-time output, and after the difference rotation Nd of the change clutch 61 is reduced to or below the standard difference rotational speed Nds, the control unit 17 returns the output of the engine 21 to the normal-time output and operates the shift motor 75 to bring the change clutch 61 into the maximum capacity C1. The standard difference rotational speed Nds is variable according to the position of the throttle valve 53 detected by the throttle position sensor 134.

When reducing the difference rotation Nd by the first intermediate capacity C2 which is a partial clutch engagement capacity, when the difference rotation Nd is reduced to or below the standard difference rotational speed Nds, the output of the engine 21 having been temporarily lowered is returned to a normal-time output, and the shift motor 75 is operated to bring the change clutch 61 to the maximum capacity C1. By this operation, the drop in the driving force of the engine 21 and the blow-up of the engine rotational speed during the period around the completion of the difference rotation absorption can be effectively restrained. The extent to which the acceleration vibration is generated when the difference rotation Nd is reduced to or below the standard difference rotational speed Nds and the change clutch 61 is brought to the maximum capacity C1 depends on the position of the throttle valve 53 representing the load on the engine 21 at that time. Therefore, with the standard difference rotational speed Nds variable according to the position of the throttle valve 53 detected by the throttle position sensor 134, it is possible to engage the change clutch 61 to attain the maximum capacity C1 at a difference rotation Nd according to the engine load and thereby to effectively restrain the generation of acceleration vibration V.

Note that examples of the technique for lowering the output of the engine 21 includes a retard control of ignition at the spark plug 57, an ignition cut control, a throttling control at the throttle valve 53 provided in the intake pipe 52, and a fuel injection control at the fuel injection valve 54 (cut-down or cut of the fuel injection amount).

The standard difference rotational speed Nds is set lower as the position of the throttle valve 53 is greater. As the position of the throttle valve 53 is greater, the torque of the engine 21 is greater and the acceleration vibration V is more likely to occur upon completion of the difference rotation absorption. For this reason, by setting the standard difference rotational speed Nds to be lower as the position of the throttle valve 53 is greater, the timing for engaging the change clutch 61 to attain the maximum capacity C1 upon completion of absorption of the difference rotation Nd can be set properly, and the generation of acceleration vibration V can be effectively restrained.

According to another embodiment of the present invention, the automatic speed change apparatus 25 includes the main shaft 65 to which rotational power of the engine 21 is inputted through the change clutch 61 and which is provided with the plurality of driving gears inclusive of the driving gear 67b. The counter shaft 66 is provided with the plurality of driven gears driven by the driving gears, the driven gears including the driven gear 68c. The clutch operation mechanism 62 is driven by the shift motor 75 and configured to engage and disengage the change clutch 61. The gear change mechanism 63 is configured to operate the driving gear 67b or the driven gear 68c to thereby operate the gear position, and the control unit 17 is configured to operate the shift motor 75. The engine rotational speed sensor 58 for detecting the rotational speed Ne of the engine 21. The main shaft rotational speed sensor 65a is for detecting the rotational speed Nm of the main shaft 65 on downstream side of the change clutch 61. The control unit 17 is configured to control the output of the engine 21 and detect the difference rotation Nd of the change clutch 61 on the basis of values detected by the engine rotational speed sensor 58 and the main shaft rotational speed sensor 65a. The change clutch 61 has the first intermediate capacity C2 between the maximum capacity C1 and the disengagement capacity C4. In the automatic speed change apparatus 25, the control unit 17 is so configured that after the gear change mechanism 63 has changed the gear position at the time of a shift, the control unit 17 operates the shift motor 75 to put the change clutch 61 into the first intermediate capacity C2, thereby reducing the difference rotation Nd of the change clutch 61, and temporarily lowers the output of the engine 21 below a normal-time output, and after the difference rotation Nd of the change clutch 61 is reduced to or below the standard difference rotational speed Nds, the control unit 17 returns the output of the engine 21 to the normal-time output, and operates the shift motor to bring the change clutch 61 into the maximum capacity C1, the standard difference rotational speed Nds being variable according to the rotational speed Ne of the engine 21 detected by the engine rotational speed sensor 58.

The extent to which the acceleration vibration is generated when the difference rotation Nd of the change clutch 61 is reduced to or below the standard difference rotational speed Nds and the change clutch 61 is brought to the maximum capacity C1 depends on the rotational speed Ne of the engine 21 at that time. For this reason, with the standard difference rotational speed Nds being variable according to the rotational speed Ne detected by the engine rotational speed sensor 58, the change clutch 61 can be engaged to attain the maximum capacity C1 at the difference rotation Nd according to the rotational speed Ne, and the generation of acceleration vibration V can be effectively restrained.

Furthermore, the standard difference rotational speed Nds is set to be higher as the rotational speed Ne of the engine 21 is higher. As the rotational speed Ne is higher, the torque of the engine 21 is smaller, and the acceleration vibration is less likely to occur at the time of completion of the difference rotation absorption. For this reason, with the standard difference rotational speed Nds set higher as the rotational speed Ne of the engine 21 is higher, it is possible to effectively restrain the acceleration vibration V while shortening the time for which the change clutch 61 is in a disengaged state.

Note that the above embodiments are merely exemplary embodiments of the present invention, and the present invention is not to be limited to the above embodiments.

While the throttle position sensor 134 for detecting the position (angle or opening) of the throttle vale 53 has been described as an example of the engine load detection means, the present invention is not restricted to this. For example, the engine load detection means may be a negative pressure sensor for detecting the pressure of intake air passing through the intake pipe 52, the sensor being provided at the intake pipe 52. In this case, a smaller negative pressure means a greater position (angle or opening) of the throttle valve 53. For this reason, the load of the engine 21 is greater as the negative pressure is smaller.

Further, while the above embodiments describe the motorcycle 10 as an example of the vehicle, the present invention is not limited to this but may be applied to such vehicles as three-wheeled vehicles and four-wheeled vehicles.

DESCRIPTION OF REFERENCE SYMBOLS

10: Motorcycle (Vehicle)
17: Control unit (Controller)
21: Engine
25: Automatic speed change apparatus (Speed change apparatus)
58: Engine rotational speed sensor (Engine rotational speed detection means)
61: Change clutch (Clutch)
62: Clutch operation mechanism (Clutch operation member)
63: Gear change mechanism (Gear change operation mechanism)
65: Main shaft
65a: Main shaft rotational speed sensor (Main shaft rotational speed detection means)
66: Counter shaft
67b: Driving gear (Driving-side shifter gear)
68c: Driven gear (Driven-side shifter gear)
75: Shift motor (Actuator)
134: Throttle position sensor (Engine load detection means)
C1: Maximum capacity (Clutch full capacity state)
C2: First intermediate capacity (Partial clutch engagement state)
C4: Disengagement capacity (Clutch disengaged state)
Nd: Difference rotation
Nds: Standard difference rotational speed
Ne: Rotational speed (Rotational speed of engine)
Nm: Rotational speed (Rotational speed of main shaft)
Th: Throttle position (Engine load)

The invention claimed is:

1. A speed change apparatus for a vehicle, said apparatus comprising:

a main shaft to which rotational power of an engine is inputted through a clutch, and which is provided with a plurality of driving gears inclusive of a driving-side shifter gear;

a counter shaft provided with a plurality of driven gears driven by the driving gears, the driven gears including a driven-side shifter gear;

a clutch operation member driven by an actuator and configured to engage and disengage the clutch;

a gear change operation mechanism configured to operate the driving-side shifter gear or the driven-side shifter gear to thereby operate a gear position;

a controller configured to operate the actuator;

an engine rotational speed detection unit configured to detect rotational speed of the engine; and a main shaft rotational speed detection unit configured to detect rotational speed of the main shaft on a downstream side of the clutch;

wherein the controller is configured to control an output of the engine and detect difference rotation of the clutch based upon values detected by the engine rotational speed detection unit and the main shaft rotational speed detection unit, wherein the clutch has a partial clutch engagement state between a clutch full capacity state and a clutch disengaged state, said apparatus further comprising an engine load detection unit configured to detect a load on the engine, wherein the controller is configured such that after the gear change operation mechanism has changed a gear position at a time of a shift, the controller operates the actuator to put the clutch into the partial clutch engagement state, thereby reducing the difference rotation of the clutch, and temporarily lowers the output of the engine below a normal-time output, and after the difference rotation of the clutch is reduced to or below a standard difference rotational speed, the controller returns the output of the engine to the normal-time output and operates the actuator to bring the clutch into the full capacity state, the standard difference rotational speed being variable according to the engine load detected by the engine load detection unit.

2. The speed change apparatus for a vehicle according to claim 1, wherein the standard difference rotational speed is set to be lower as the engine load is higher.

3. A speed change apparatus for a vehicle, said apparatus comprising:

a main shaft to which rotational power of an engine is inputted through a clutch and which is provided with a plurality of driving gears inclusive of a driving-side shifter gear;

a counter shaft provided with a plurality of driven gears driven by the driving gears, the driven gears including a driven-side shifter gear;

a clutch operation member driven by an actuator and configured to engage and disengage the clutch;

a gear change operation mechanism configured to operate the driving-side shifter gear or the driven-side shifter gear to thereby operate a gear position;

a controller configured to operate the actuator;

an engine rotational speed detection unit configured to detect rotational speed of the engine; and a main shaft rotational speed detection unit configured to detect rotational speed of the main shaft on a downstream side of the clutch;

wherein the controller is configured to control an output of the engine and detect difference rotation of the clutch based upon values detected by the engine rotational speed detection unit and the main shaft rotational speed detection unit;

wherein the clutch has a partial clutch engagement state between a clutch full capacity state and a clutch disengaged state, wherein the controller is so configured that after the gear change operation mechanism has changed the gear position at a time of a shift, the controller operates the actuator to put the clutch into the partial clutch engagement state, thereby reducing the difference rotation of the clutch, and temporarily lowers the output of the engine below a normal-time output, and after the difference rotation of the clutch is reduced to or below a standard difference rotational speed, the controller returns the output of the engine to the normal-time output, and operates the actuator to bring the clutch into the full capacity state, the standard difference rotational speed being variable according to the rotational speed of the engine detected by the engine rotational speed detection unit.

4. The speed change apparatus for a vehicle according to claim 3, wherein the standard difference rotational speed is set to be higher as the rotational speed of the engine is higher.

5. A speed change apparatus for a vehicle, said apparatus comprising:

main shaft means for receiving rotational power of an engine through a clutch, said main shaft means including a plurality of driving gears including a driving-side shifter gear;

counter shaft means including a plurality of driven gears being driven by the driving gears, the driven gears including a driven-side shifter gear;

clutch operation means for engaging and disengaging the clutch, said clutch operation means being driven by actuator means;

gear change operation means for operating the driving-side shifter gear or the driven-side shifter gear to thereby operate a gear position;

controller means for operating the actuator means;

engine rotational speed detection means for detecting rotational speed of the engine; and main shaft rotational speed detection means for detecting rotational speed of the main shaft means on a downstream side of the clutch;

wherein the controller means is also for controlling an output of the engine and for detecting difference rotation of the clutch based upon values detected by the engine rotational speed detection means and the main shaft rotational speed detection means, wherein the clutch has a partial clutch engagement state between a clutch full capacity state and a clutch disengaged state, said apparatus further comprising engine load detection means for detecting a load on the engine, wherein the controller means is also for, after the gear change operation means has changed a gear position at a time of a shift, operating the actuator means to put the clutch into the partial clutch engagement state, thereby reducing the difference rotation of the clutch and temporarily lowering the output of the engine below a normal-time output, and after the difference rotation of the clutch is reduced to or below a standard difference rotational speed, the controller means returns the output of the engine to the normal-time output and operates the actuator means to bring the clutch into the full capacity state, the standard difference rotational speed being variable according to the engine load detected by the engine load detection means.

6. The speed change apparatus for a vehicle according to claim 5, wherein the standard difference rotational speed is set to be lower as the engine load is higher.

7. A speed change apparatus for a vehicle, said apparatus comprising:

main shaft means for receiving rotational power of an engine through a clutch, said main shaft means including a plurality of driving gears and including a driving-side shifter gear;

counter shaft means including a plurality of driven gears driven by the driving gears, the driven gears including a driven-side shifter gear;

clutch operation means driven by an actuator means, said clutch operation means for engaging and disengaging the clutch;

gear change operation means for operating the driving-side shifter gear or the driven-side shifter gear to thereby operate a gear position;

controller means for operating the actuator means;

engine rotational speed detection means for detecting rotational speed of the engine; and main shaft rotational speed detection means for detecting rotational speed of the main shaft on a downstream side of the clutch;

wherein the controller means is for controlling an output of the engine and for detecting difference rotation of the clutch based upon values detected by the engine rotational speed detection means and the main shaft rotational speed detection means;

wherein the clutch has a partial clutch engagement state between a clutch full capacity state and a clutch disengaged state, wherein the controller means is also for, after the gear change operation means has changed the gear position at a time of a shift, operating the actuator means to put the clutch into the partial clutch engagement state, thereby reducing the difference rotation of the clutch, and temporarily lowering the output of the engine below a normal-time output, and after the difference rotation of the clutch is reduced to or below a standard difference rotational speed, the controller means returns the output of the engine to the normal-time output, and operates the actuator to bring the clutch into the full capacity state, the standard difference rotational speed being variable according to the rotational speed of the engine detected by the engine rotational speed detection means.

8. The speed change apparatus for a vehicle according to claim 7, wherein the standard difference rotational speed is set to be higher as the rotational speed of the engine is higher.

* * * * *